(12) United States Patent
Chae et al.

(10) Patent No.: US 10,800,330 B2
(45) Date of Patent: Oct. 13, 2020

(54) AROUND VIEW MONITORING APPARATUS FOR VEHICLE, AND VEHICLE

(71) Applicant: LG Electronics Inc., Seoul (KR)

(72) Inventors: Kyuyeol Chae, Seoul (KR); Kwon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 15/857,900

(22) Filed: Dec. 29, 2017

(65) Prior Publication Data
US 2019/0061621 A1    Feb. 28, 2019

(30) Foreign Application Priority Data

Aug. 29, 2017    (KR) .......................... 10-2017-0109682

(51) Int. Cl.
*B60R 1/00*    (2006.01)
*G06T 7/174*    (2017.01)
(Continued)

(52) U.S. Cl.
CPC ............ *B60R 1/00* (2013.01); *G02B 13/0075* (2013.01); *G06T 7/11* (2017.01); *G06T 7/174* (2017.01); *H04N 5/2253* (2013.01); *H04N 5/2254* (2013.01); *H04N 5/2259* (2013.01); *H04N 5/23216* (2013.01); *H04N 5/23229* (2013.01); *H04N 5/23238* (2013.01); *H04N 5/247* (2013.01); *H04N 7/181* (2013.01); *B60R 2300/105* (2013.01); *B60R 2300/303* (2013.01); *B60R 2300/306* (2013.01);
(Continued)

(58) Field of Classification Search
CPC ................ B60R 1/00; B60R 2300/105; B60R 2300/303; B60R 2300/306; B60R 2300/8066; G06T 7/11; G06T 7/174; G02B 13/0075; G02B 27/126; H04N 5/2253; H04N 5/2254; H04N 5/23216; H04N 5/23229; H04N 5/247; G05D 1/0246; G05D 2201/0213
USPC .......................................................... 348/148
See application file for complete search history.

(56) References Cited

U.S. PATENT DOCUMENTS

2006/0266835 A1    11/2006 Tanida
2015/0163390 A1*   6/2015 Lee ...................... H04N 5/2352
                                                      348/149
(Continued)

FOREIGN PATENT DOCUMENTS

EP        3150437      4/2017
JP        H09139878    5/1997
(Continued)

OTHER PUBLICATIONS

Extended European Search Report in European Appln. No. 18184431.7, dated Jan. 10, 2019, 7 pages.

*Primary Examiner* — William C Vaughn, Jr.
*Assistant Examiner* — Jae N Noh
(74) *Attorney, Agent, or Firm* — Fish & Richardson P.C.

(57) ABSTRACT

An around view monitoring apparatus includes: a plurality of cameras; and at least one processor configured to process a plurality of images acquired through the plurality of cameras, wherein one or more of the plurality of cameras include a lens unit configured to form, in each of the acquired images, a first focal length in a first region and a second focal length different from the first focal length in a second region.

20 Claims, 28 Drawing Sheets

(51) Int. Cl.
    *H04N 5/225*     (2006.01)
    *H04N 5/247*     (2006.01)
    *G06T 7/11*     (2017.01)
    *H04N 5/232*     (2006.01)
    *G02B 13/00*     (2006.01)
    *H04N 7/18*     (2006.01)
    *G02B 27/12*     (2006.01)
    *G05D 1/02*     (2020.01)

(52) U.S. Cl.
    CPC .... *B60R 2300/8066* (2013.01); *G02B 27/126* (2013.01); *G05D 1/0246* (2013.01); *G05D 2201/0213* (2013.01)

(56) References Cited

U.S. PATENT DOCUMENTS

2017/0242442 A1\*   8/2017   Minster ................ G05D 1/0248
2018/0307925 A1\*  10/2018   Wisniowski ....... G06K 9/00825
2019/0199937 A1\*   6/2019   Fluegel .................. H04N 7/181

FOREIGN PATENT DOCUMENTS

| JP | 2016054487 | 4/2016 |
|---|---|---|
| KR | 2011013415 | 2/2011 |
| KR | 2016009157 | 1/2016 |
| KR | 1020160076736 | 7/2016 |
| KR | 101763386 | 8/2017 |
| WO | WO2015090997 | 6/2015 |

\* cited by examiner

AROUND VIEW MONITORING APPARATUS FOR VEHICLE, AND VEHICLE

CROSS-REFERENCE TO RELATED APPLICATION

This application claims the priority benefit of Korean Patent Application No. 10-2017-0109682, filed on Aug. 29, 2017 in the Korean Intellectual Property Office, the disclosure of which is incorporated herein by reference.

TECHNICAL FIELD

The present disclosure relates to an around view monitoring apparatus for a vehicle, and a vehicle including the same.

BACKGROUND

A vehicle is an apparatus configured to move a user in the user's desired direction. A representative example of a vehicle may be an automobile.

Various types of sensors and electronic devices may be provided in the vehicle to enhance user convenience. For example, an Advanced Driver Assistance System (ADAS) is being actively developed for enhancing the user's driving convenience and safety. In addition, autonomous vehicles are being actively developed. As part of this effort, a vehicle may be equipped with several cameras to provide ADAS functionality.

SUMMARY

Disclosed herein is an around view monitoring apparatus including a plurality of cameras and a processor configured to process a plurality of images acquired through the plurality of cameras.

In one aspect, an around view monitoring apparatus includes: a plurality of cameras; and at least one processor configured to process a plurality of images acquired through the plurality of cameras, wherein one or more of the plurality of cameras include a lens unit configured to form, in each of the acquired images, a first focal length in a first region and a second focal length different from the first focal length in a second region.

Implementations may include one or more of the following features. For example, the first region corresponds to a first angle of view, and the second region corresponds to a second angle of view larger than the first angle of view.

In some implementations, the processor is configured to process the plurality of images acquired through the plurality of cameras by: separating the first region and the second region; and processing the first region and the second region.

In some implementations, the processor is configured to process the first region and the second region by: generating a narrow-angle image based on the first region; and generating a wide-angle image by synthesizing the first region and the second region based on a mapping function.

In some implementations, the apparatus further includes an interface configured to exchange data with one or more devices in a vehicle, and the processor is further configured to provide, through the interface, the narrow-angle image and the wide-angle image to the one or more devices.

In some implementations, the processor is configured to provide the narrow-angle image and the wide-angle image to the one or more devices by: alternating between providing, in frame units or slice units, (i) the narrow-angle image, and (ii) the wide-angle image to the one or more devices.

In some implementations, the interface includes first and second ports configured to connect to respective cables, and the processor is configured to provide the narrow-angle image and the wide-angle image to the one or more devices by: providing, through the first port, the narrow-angle image; and providing, through the second port, the wide-angle image.

In some implementations, the apparatus further includes a display unit, and the processor is further configured to display, through the display unit, an image based on the narrow-angle image and the wide-angle image.

In some implementations, the one or more of the plurality of cameras include an image sensor comprising two or more pixel arrays, wherein each of the two or more pixel arrays corresponds to one of two or more regions, and is configured to convert light transmitted through the lens unit to the two or more pixel arrays into one or more electrical signals.

In some implementations, the two or more pixel arrays have different pixel densities.

In some implementations, the plurality of cameras includes a front camera configured to acquire a front image of a vehicle, and the front camera includes a first lens unit configured to form, in the front image, a third focal length in a central region and a fourth focal length different from the third focal length in a peripheral region.

In some implementations, a vertical angle of view of the front image is equal to a horizontal angle of view of the front image.

In some implementations, the front camera includes a first image sensor including: a first pixel array corresponding to the central region; and a second pixel array corresponding to the peripheral region, wherein the first pixel array and the second pixel array have different pixel densities.

In some implementations, the processor is further configured to correct a lens distortion of the front image.

In some implementations, the plurality of cameras includes a rear camera configured to acquire a rear image of a vehicle, wherein the rear camera includes a second lens unit configured to form a fifth focal length in the rear image.

In some implementations, a vertical angle of view of the rear image is equal to a horizontal angle of view of the rear image.

In some implementations, the plurality of cameras includes a left camera configured to acquire a left image of a vehicle, wherein the left camera includes a third lens unit configured to form, in the left image, a sixth focal length in a right region and a seventh focal length different from the sixth focal length in a left region.

In some implementations, the left camera includes a third image sensor including: a third pixel array corresponding to the right region; and a fourth pixel array corresponding to the left region, wherein the third pixel array and the fourth pixel array have different pixel densities.

In some implementations, the plurality of cameras includes a right camera configured to acquire a right image of a vehicle, wherein the right camera includes a fourth lens unit configured to form, in the right image, a seventh focal length in a left region and an eighth focal length different from the seventh focal length in a right region.

In some implementations, the right camera includes a fourth image sensor including: a fifth pixel array corresponding to the left region; and a sixth pixel array corresponding to the right region, wherein the fifth pixel array and the sixth pixel array have different pixel densities.

DETAILED DESCRIPTION

Disclosed herein is an around view monitoring (AVM) apparatus including a plurality of cameras and a processor configured to process a plurality of images acquired through the plurality of cameras.

Each camera included in a vehicle typically has an angle of view and resolution suitable for a particular function. For example, the vehicle may include a forward-looking around view monitoring camera, and a separate camera for detecting a forward object.

Due to different angles of view and different functions of the two cameras, a forward-looking AVM camera and a forward object detection camera may be separately provided. However, including multiple cameras leads to increased costs, and hence reducing number of cameras by using a single camera for multiple purposes may be beneficial.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

In the following description, the left of a vehicle means the left of a driving direction of the vehicle, and the right of the vehicle means the right of the driving direction of the vehicle.

Figure 1:
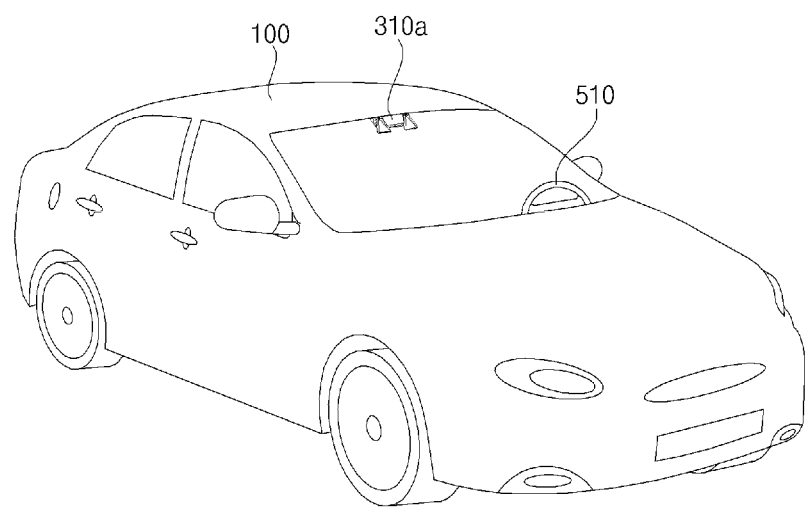
FIG. 1 is a diagram illustrating an example of an exterior of a vehicle.
Figure 1:
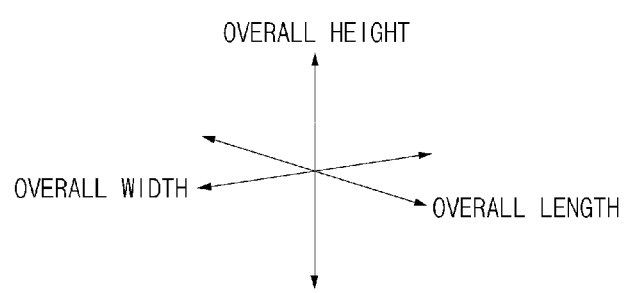

FIG. 1 is a diagram illustrating an example of an exterior of a vehicle.

Figure 2:
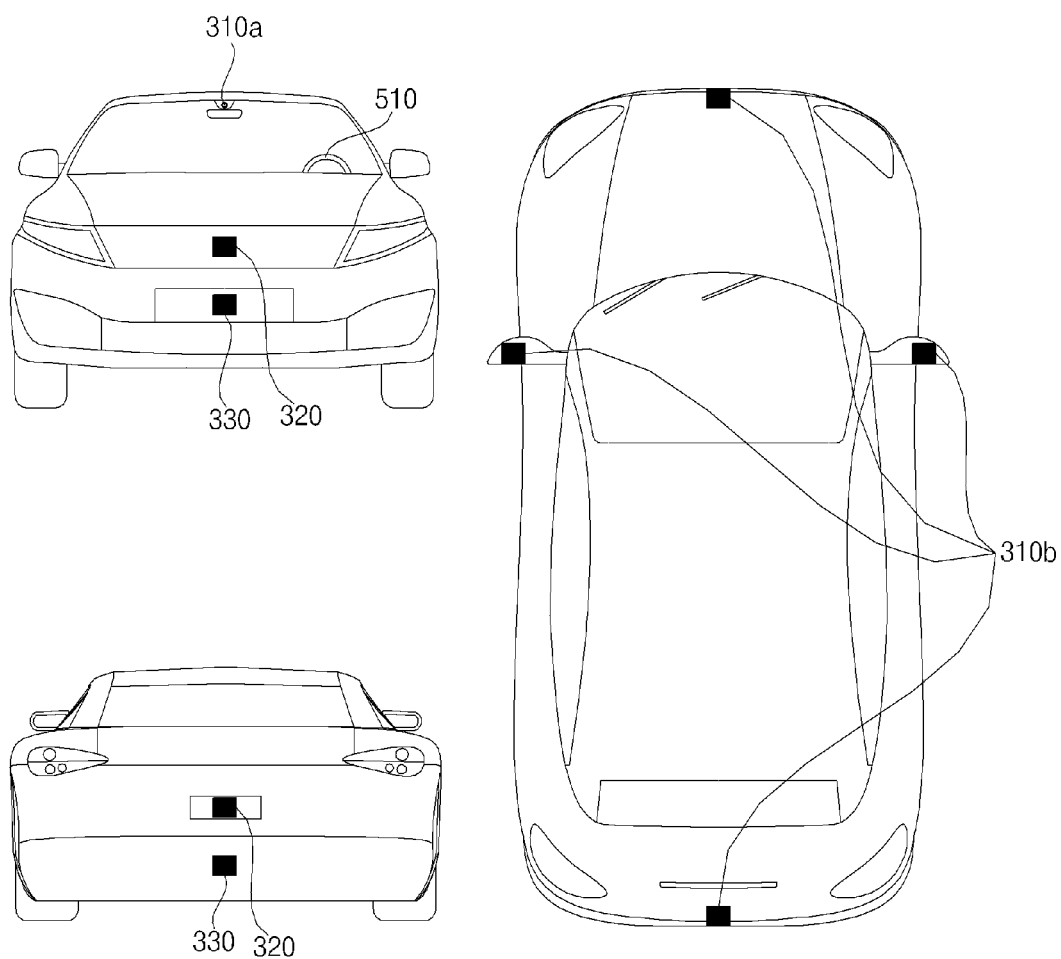
FIG. 2 is a diagram illustrating an example of a vehicle at various angles.

FIG. 2 is a diagram illustrating an example of a vehicle at various angles.

Figure 3:
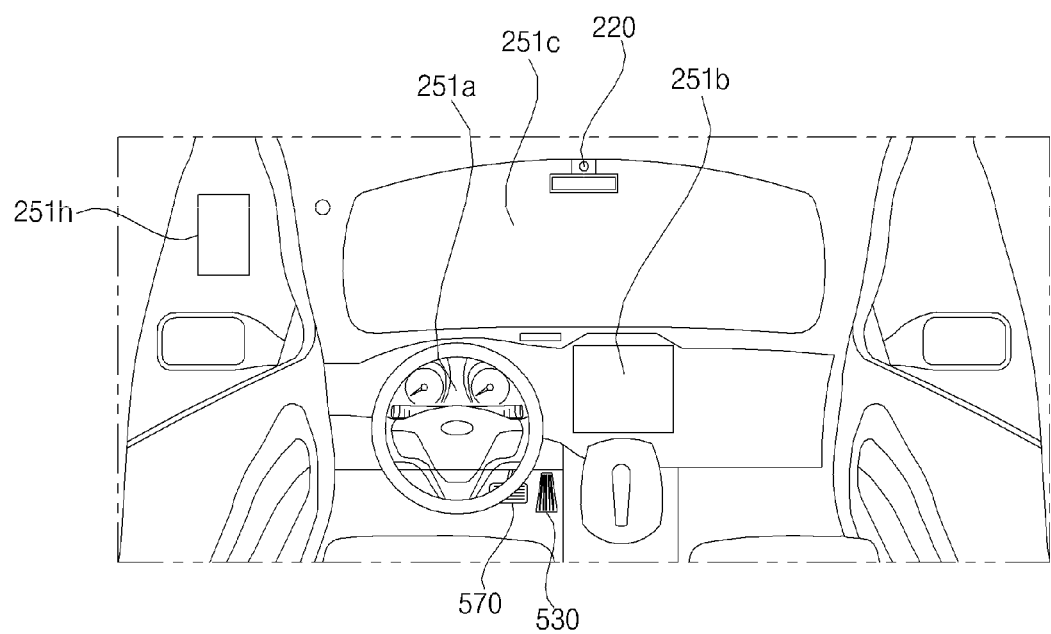
FIGS. 3 and 4 are views illustrating an interior portion of an example of a vehicle.
Figure 4:
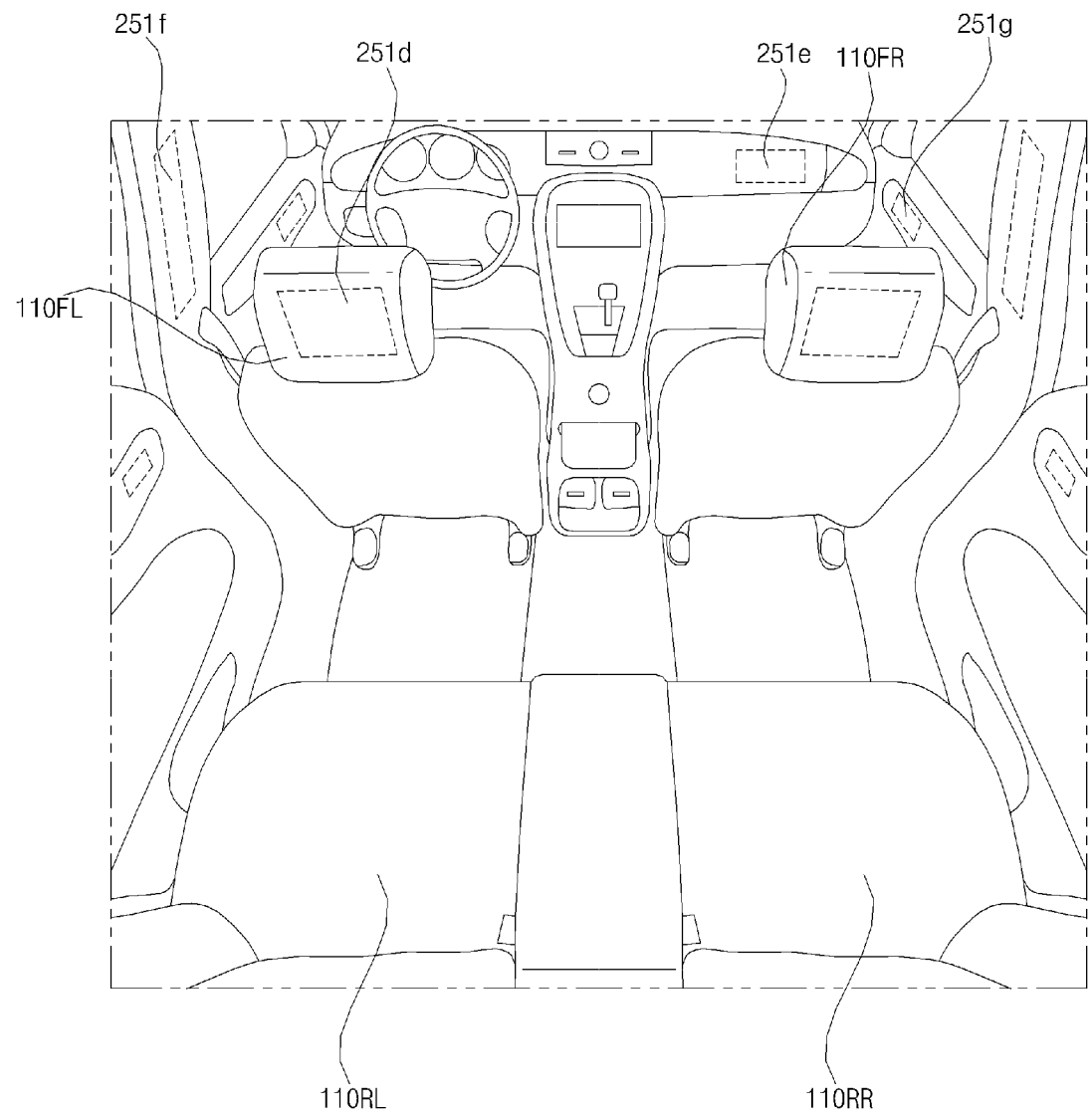

FIGS. 3 and 4 are views illustrating an interior portion of an example of a vehicle.

Figure 5:
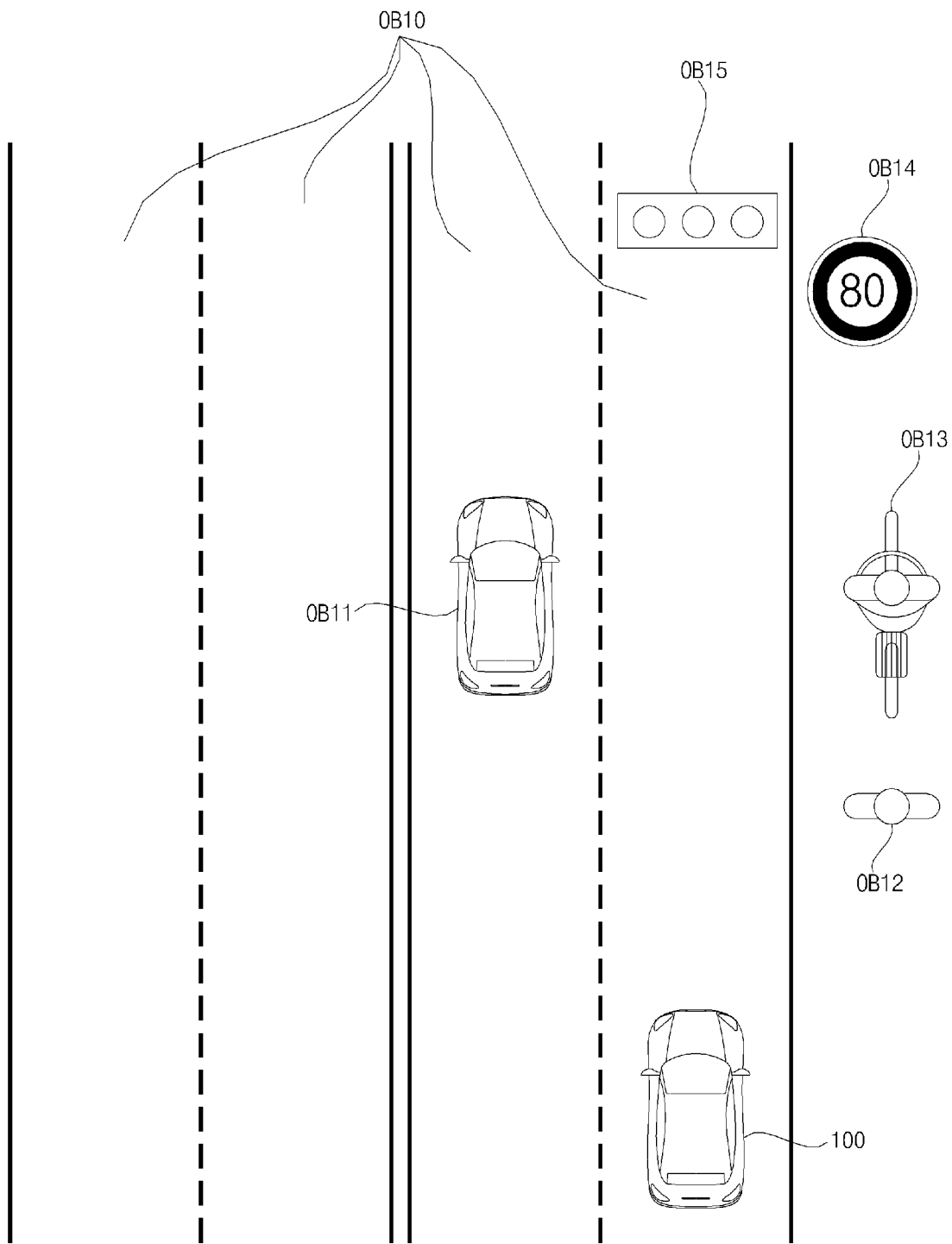
FIGS. 5 and 6 are reference views illustrating examples of objects that are relevant to driving.
Figure 6:
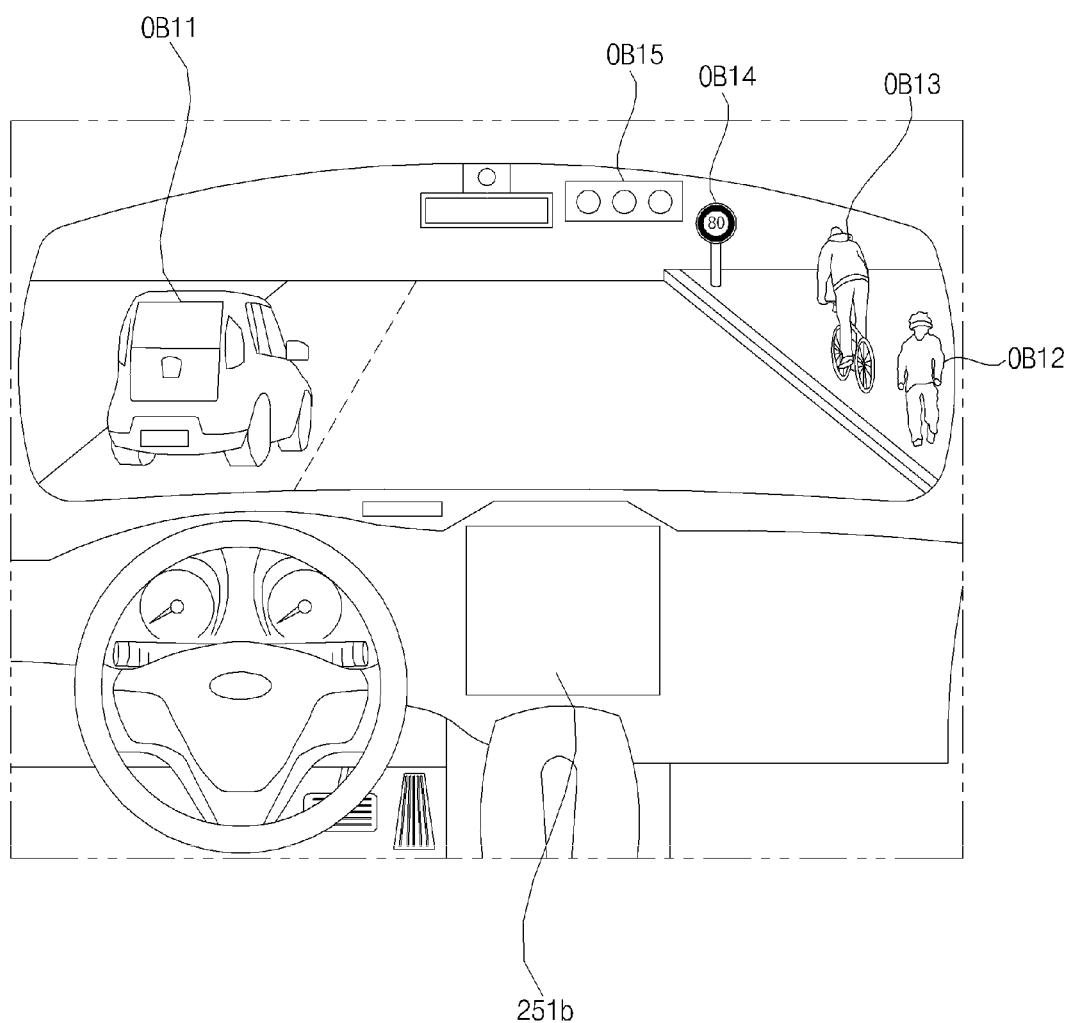

FIGS. 5 and 6 are reference views illustrating examples of objects that are relevant to driving.

Figure 7:
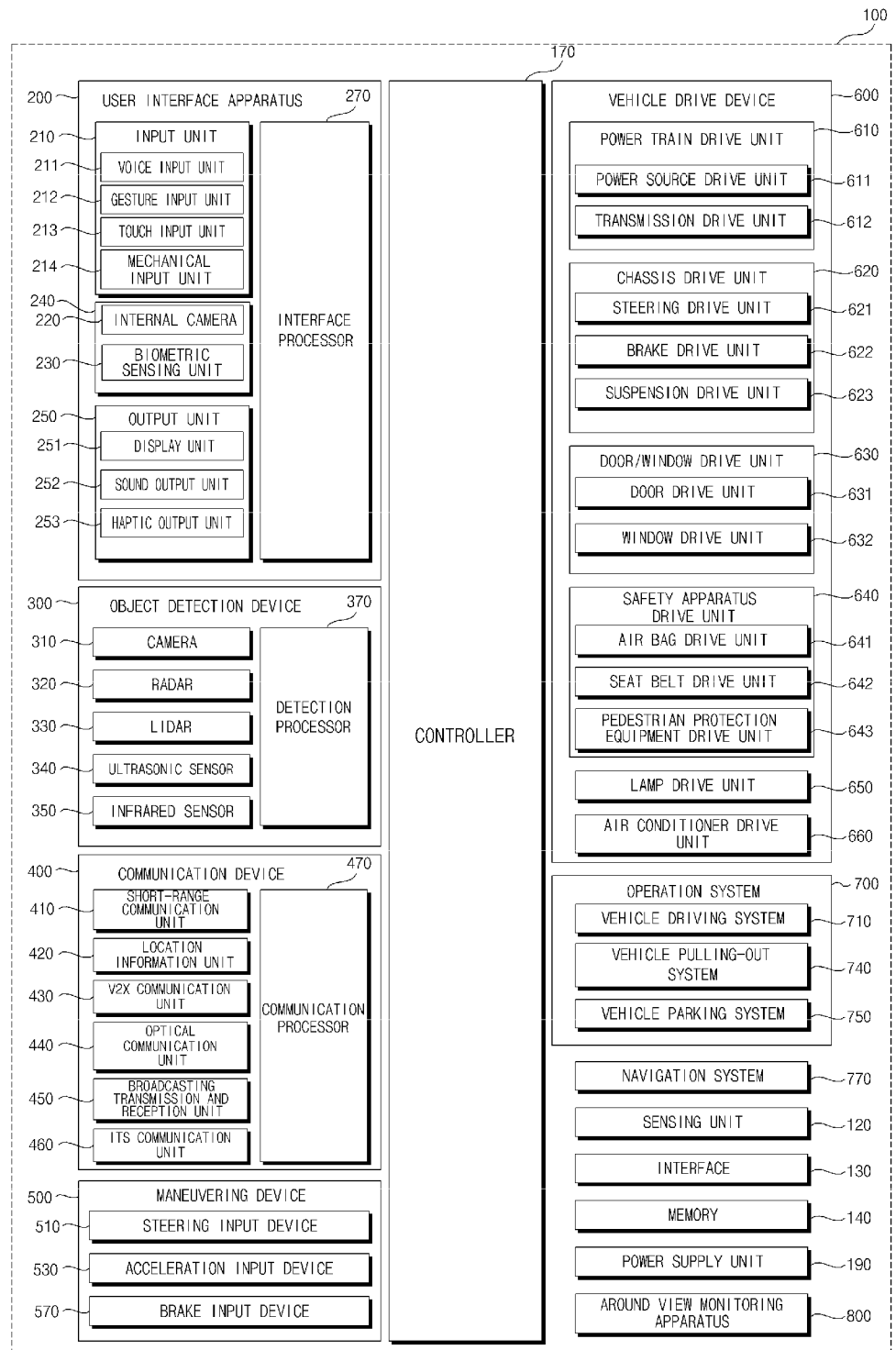
FIG. 7 is a block diagram illustrating subsystems of an example of a vehicle.

FIG. 7 is a block diagram illustrating subsystems of an example of a vehicle.

Referring to FIGS. 1 to 7, a vehicle 100 may include wheels rotated by a power source, and a steering input unit 510 for controlling the direction of travel of the vehicle 100.

The vehicle 100 may be an autonomous vehicle.

The vehicle 100 may enter an autonomous mode or a manual mode based on user input.

For example, the control mode of the vehicle 100 may be switched from the manual mode to the autonomous mode or from the autonomous mode to the manual mode based on user input received through a user interface device 200.

The control mode of the vehicle 100 may be switched to the manual mode or the autonomous mode based on driving situation information.

The driving situation information may include at least one of information on an object outside the vehicle, navigation information and vehicle state information.

For example, the control mode of the vehicle 100 may be switched from the manual mode to the autonomous mode or from the autonomous mode to the manual mode based on driving situation information generated by an object detection device 300.

For example, the control mode of the vehicle 100 may be switched from the manual mode to the autonomous mode or from the autonomous mode to the manual mode based on driving situation information received through a communication device 400.

For example, the control mode of the vehicle 100 may be switched from the manual mode to the autonomous mode or from the autonomous mode to the manual mode based on information, and data signals provided by an external device.

If the vehicle 100 operates in the autonomous mode, the autonomous vehicle 100 may operate based on an operation system 700.

For example, the autonomous vehicle 100 may operate based on information, data or signals generated by a driving system 710, a park-out system 740, and a park-in system 750.

If the vehicle 100 operates in the manual mode, the autonomous vehicle 100 may receive user input for driving through a driving manipulation device 500. The vehicle 100 may be driven based on user input received through the driving manipulation device 500.

An overall length refers to a length from the front side to the rear side of the vehicle 100, an overall width refers to a width of the vehicle 100, and an overall height refers to a length from the bottom of a wheel to the roof of the vehicle 100. In the following description, an overall length direction L may mean a direction based on which the overall length of the vehicle 100 is measured, an overall width direction W may mean a direction based on which the overall width of the vehicle 100 is measured, and an overall height direction H may mean a direction based on which the overall height of the vehicle 100 is measured.

As illustrated in FIG. 7, the vehicle 100 may include a user interface (UI) device 200, the object detection device 300, the communication device 400, the driving manipulation device 500, the vehicle driving device 600, the operation system 700, the navigation system 770, the sensing unit 120, the interface unit 130, the memory 140, the controller 170, and a power supply 190.

In some implementations, the vehicle 100 may further include a new component in addition to the components described in the present disclosure, or may not include a part of the described components.

The UI device 200 is a device used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some implementations, the UI device 200 may further include a new component in addition to the above-described components, or may not include a part of the above-described components.

The input unit 210 serves to receive a user command from a user. Data collected by the input unit 210 may be analyzed by the processor 270, and processed as a control command from the user.

The input unit 210 may be disposed inside the vehicle 100. For example, the input unit 210 may be disposed in an area of a steering wheel, an area of an instrument panel, an area of a seat, an area of each pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert voice input of the user into an electrical signal. The converted electrical signal may be provided to the processor 270 or the controller 170.

The voice input unit 211 may include one or more microphones.

The gesture input unit 212 may convert gesture input of the user into an electrical signal. The electrical signal may be provided to the processor 270 or the controller 170.

The gesture input unit 212 may include at least one of an infrared (IR) sensor and an image sensor, for sensing gesture input of the user.

In some implementations, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert touch input of the user to an electrical signal. The electrical signal may be provided to the processor 270 or the controller 170.

The touch input unit 213 may include a touch sensor for sensing a touch input of the user.

In some implementations, a touchscreen may be configured by integrating the touch input unit 213 with a display unit 251. This touchscreen may provide both an input interface and an output interface between the vehicle 100 and the user.

The mechanical input unit 214 may include at least one of a button, a dome switch, a jog wheel, and a jog switch. An electrical signal generated by the mechanical input unit 214 may be provided to the processor 270 or the controller 170.

The mechanical input unit 214 may be disposed on the steering wheel, a center fascia, the center console, a cockpit module, a door, or the like.

The internal camera 220 may acquire a vehicle interior image. The processor 270 may sense a state of a user based on the vehicle interior image. The processor 270 may acquire gaze information of the user from the vehicle interior image. The processor 270 may determine a user gesture from the vehicle interior image.

The biometric sensing unit 230 may acquire biometric information about a user. The biometric sensing unit 230 may include a sensor for acquiring biometric information about a user, and acquire information about a fingerprint and heart beats, and brain waves of a user, using the sensor. The biometric information may be used to authenticate the user.

The output unit 250 is intended to generate a visual output, an acoustic output, or a haptic output.

The output unit 250 may include at least one of the display unit 251, an audio output unit 252, and a haptic output unit 253.

The display unit 251 may display graphic objects corresponding to various pieces of information.

The display unit 251 may include at least one of a Liquid Crystal Display (LCD), a Thin-Film LCD (TF LCD), an Organic Light Emitting Diode (OLED) display, a flexible display, a 3D display, and an e-ink display.

A touchscreen may be configured by forming a multilayered structure with the display unit 251 and the touch input unit 213 or integrating the display unit 251 with the touch input unit 213.

The display unit 251 may be implemented by a Head Up Display (HUD). If the display unit 251 is implemented by a HUD, the display unit 251 may be provided with a projection module, and output information through an image projected onto the windshield or a window.

The display unit 251 may include a transparent display. The transparent display may be attached to the windshield or a window.

The transparent display may have a specific transparency and display a specific screen. To have transparency, the transparent display may include at least one of a transparent Thin Film Electroluminescent (TFFL) display, a transparent OLED display, a transparent liquid crystal display (LCD), a transmissive transparent display, and a transparent LED display. The transparency of the transparent display is controllable.

In some implementations, the UI device 200 may include a plurality of display units 251a to 251g.

The display unit 251 may be disposed in an area of the steering wheel, areas 251a, 251b and 251e of the instrument panel, an area 251d of a seat, an area 251f of each pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 into an audio signal, and outputs the audio signal. For this purpose, the audio output unit 252 may include one or more speakers.

The haptic output unit 253 generates a haptic output. For example, the haptic output unit 253 may vibrate the steering wheel, a safety belt, a seat 110FL, 110FR, 110RL, or 110RR, so that a user may perceive the output.

The processor 270 may provide overall control to each unit of the UI device 200.

In some implementations, the UI device 200 may include a plurality of processor 270 or no processor 270.

If the UI device 200 does not include any processor 270, the UI device 200 may operate under the control of a processor of another device in the vehicle 100, or under the control of the controller 170.

In some implementations, the UI device 200 may be referred to as a vehicle display device.

The UI device 200 may operate under the control of the controller 170.

The object detection device 300 is a device used to detect an object located outside the vehicle 100. The object detection device 300 may generate object information based on sensing data.

The object information may include information on presence/absence of an object, location information of the object, information on a distance between the vehicle 100 and the object and relative speed information of the object to the vehicle 100.

The object may be any of various items related to driving of the vehicle 100.

Referring to FIGS. 5 and 6, objects O may include lines OB10, another vehicle OB11, a pedestrian OB12, a 2-wheel vehicle OB13, traffic signals OB14 and OB15, light, a road, a structure, a speed bump, topography, an animal, and so on.

The lanes OB10 may include a driving lane, a lane next to the driving lane, and a lane in which an oncoming vehicle is driving. The lanes OB10 may include, for example, left and right lines that define each of the lanes. The lanes may include, for example, crossroads.

The other vehicle OB11 may be a vehicle driving in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The 2-wheel vehicle OB13 may refer to a transportation means moving on two wheels, located around the vehicle 100. The 2-wheel vehicle OB13 may be a transportation means having two wheels, located within a predetermined distance from the vehicle 100. For example, the 2-wheel vehicle OB13 may be a motorbike or bicycle on a sidewalk or a roadway.

The traffic signals OB14 and OB15 may include a traffic signal lamp OB15, a traffic sign OB14, and a symbol or text drawn or written on a road surface.

The light may be light generated from a lamp of the other vehicle OB11. The light may be generated from a street lamp. The light may be sunlight.

The road may include a road surface, a curve, a slope such as a downhill road or an uphill road, and so on.

The structure may be an object fixed to the ground, near a road. For example, the structure may be any of a street lamp, a street tree, a building, a telephone pole, a signal lamp, a bridge, a curbstone, and a guard rail.

The topography may include a mountain, a hill, and so on.

Objects may be classified into mobile objects and fixed objects. For example, the mobile object may include, for example, another vehicle and a pedestrian. For example, the fixed object may include, for example, a traffic signal, a road, a structure, a stopped another vehicle and a stopped pedestrian.

The object detection device 300 may include the camera 310, a Radio Detection and Ranging (RADAR) 320, a Light Detection and Ranging (LiDAR) 330, an ultrasonic sensor 340, an IR sensor 350, and a processor 370.

In some implementations, the object detection device 300 may further include a new component in addition to the above-described components or may not include a part of the above-described components.

To acquire a vehicle exterior image, the camera 310 may be disposed at an appropriate position on the exterior of the vehicle 100. The camera 310 may be, for example, a mono camera, a stereo camera 310a, an Around View Monitoring (AVM) camera 310b, or a 360-degree camera.

The camera 310 may acquire location information of an object, information on a distance to the object or information on a relative speed of the object using various image processing algorithms.

For example, the camera 310 may acquire the information on the distance and relative speed of the object based on change in size of the object according to the lapse of time from the acquired image.

For example, the camera 310 may acquire the information on the distance and relative speed of the object through pinhole model and road surface profiling.

For example, the camera 310 may acquire the information on the distance and relative speed of the object based on disparity information from a stereo image acquired by the stereo camera 310a.

For example, to acquire an image of what lies ahead of the vehicle 100, the camera 310 may be disposed in the vicinity of a front windshield inside the vehicle 100. The camera 310 may be disposed around a front bumper or a radiator grill.

For example, to acquire an image of what lies behind the vehicle 100, the camera 310 may be disposed in the vicinity of a rear glass inside the vehicle 100. The camera 310 may be disposed around a rear bumper, a trunk, or a tailgate.

For example, to acquire an image of what lies on a side of the vehicle 100, the camera 310 may be disposed in the vicinity of at least one of side windows inside the vehicle 100. The camera 310 may be disposed, for example, around a side-view mirror, a fender, or a door.

The camera 310 may provide the acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency-Shift Keying (FSK) as a continuous-wave RADAR scheme according to a signal waveform.

The RADAR 320 may detect an object by electromagnetic waves based on a TOF or phase-shift method, and determine a location, distance, and relative speed of the detected object.

The RADAR 320 may be disposed at an appropriate position on the exterior of the vehicle in order to sense an object ahead of, behind, or beside the vehicle 100.

The LiDAR 330 may include a laser transmitter and a laser receiver. The LiDAR 330 may be implemented using a TOF or phase-shift method.

The LiDAR 330 may be implemented in a driven or non-driven manner.

If the LiDAR 330 is implemented in a driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object by laser light based on a TOF or phase-shift method, and determine a location, distance, and relative speed of the detected object.

The LiDAR 330 may be disposed at an appropriate position on the exterior of the vehicle 100 in order to sense an object ahead of, behind, or beside the vehicle 100.

The ultrasonic sensor 340 may include an ultrasonic wave transmitter and an ultrasonic wave receiver. The ultrasonic sensor 340 may detect an object by ultrasonic waves, and determine a location, distance, and relative speed of the detected object.

The ultrasonic sensor 340 may be disposed at an appropriate position on the exterior of the vehicle 100 in order to sense an object ahead of, behind, or beside the vehicle 100.

The IR sensor 350 may include an IR transmitter and an IR receiver. The IR sensor 350 may detect an object using IR light, and determine a location, distance, and relative speed of the detected object.

The IR sensor 350 may be disposed at an appropriate position on the exterior of the vehicle 100 in order to sense an object ahead of, behind, or beside the vehicle 100.

The processor 370 may provide overall control to each unit of the object detection device 300.

The processor 370 may compare data sensed by the camera 310, the RADAR 320, the LiDAR 330, the ultrasonic sensor 340 and the IR sensor 350 with prestored data, thereby detecting or classifying objects.

The processor 370 may detect an object and track the detected object, based on an acquired image. The processor 370 may perform operations including calculation of a distance to the object, and calculation of a relative speed of the object, using an image processing algorithm.

For example, the processor 370 may acquire the information on the distance and relative speed of the object based on change in size of the object according to the lapse of time from the acquired image.

For example, the processor 370 may acquire the information on the distance and relative speed of the object through pinhole model and road surface profiling.

For example, the processor 370 may acquire the information on the distance and relative speed of the object based on disparity information from a stereo image acquired by the stereo camera 310a.

The processor 370 may detect an object and track the detected object based on electromagnetic waves which are transmitted, are reflected from an object, and then return. The processor 370 may perform operations including calculation of a distance to the object and a relative speed of the object, based on the electromagnetic waves.

The processor 370 may detect an object and track the detected object based on laser light which is transmitted, is reflected from an object, and then returns. The processor 370 may perform operations including calculation of a distance to the object and a relative speed with respect to the object, based on the laser light.

The processor 370 may detect an object and track the detected object based on ultrasonic waves which are transmitted, are reflected from an object, and then return. The processor 370 may perform operations including calculation of a distance to the object and a relative speed with respect to the object based on the ultrasonic waves.

The processor 370 may detect an object and track the detected object based on IR light which is transmitted, is reflected from an object, and then returns. The processor 370 may perform operations including calculation of a distance to the object and a relative speed with respect to the object based on the IR light.

In some implementations, the object detection device 300 may include a plurality of sensing processors 370 or no processor 370. For example, each of the camera 310, the RADAR 320, the LiDAR 330, the ultrasonic sensor 340, and the IR sensor 350 may include a processor individually.

If the object detection device 300 does not include the processor 370, the object detection device 300 may operate under the control of a processor of a device in the vehicle 100 or under the control of the controller 170.

The object detection device 300 may operate under the control of the controller 170.

The communication device 400 is used to communicate with an external device. The external device may be one of another vehicle, a mobile terminal, and a server.

The communication device 400 may include at least one of a transmission antenna and a reception antenna, for communication, and a Radio Frequency (RF) circuit and device, for implementing various communication protocols.

The communication device 400 may include a short-range communication unit 410, a location information unit 420, a V2X communication unit 430, an optical communication unit 440, a broadcast transceiver unit 450, an Intelligent Transport System (ITS) communication unit 460, and a processor 470.

In some implementations, the communication device 400 may further include a new component in addition to the above-described components, or may not include a part of the above-described components.

The short-range communication module 410 may support short-range communication, using at least one of Bluetooth™, Radio Frequency Identification (RFID), Infrared Data Association (IrDA), Ultra-Wideband (UWB), ZigBee, Near Field Communication (NFC), Wireless Fidelity (Wi-Fi), Wi-Fi Direct, and Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include a Global Positioning System (GPS) module or a Differential Global Positioning System (DGPS) module.

The V2X communication unit 430 is a unit used for wireless communication with a server (by Vehicle to Infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal into an optical signal and radiating the optical signal to the outside, and an optical receiver for converting a received optical signal into an electrical signal.

In some implementations, the optical transmitter may be integrated with a lamp included in the vehicle 100.

The broadcast transceiver unit 450 is a unit used to receive a broadcast signal from an external broadcast management server or transmit a broadcast signal to the broadcast management server, through a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data or signals with a traffic system. The ITS communication unit 460 may provide acquired information and data to the traffic system. The ITS communication unit 460 may receive information, data or signals from the traffic system. For example, the ITS communication unit 460 may receive road traffic information from the traffic system and provide the road traffic information to the controller 170. For example, the ITS communication unit 460 may receive a control signal from the traffic system and provide the control signal to the controller 170 or the processor provided in the vehicle 100.

The processor 470 may provide overall control to each unit of the communication device 400.

In some implementations, the communication device 400 may include a plurality of communication processors 470.

In some other implementations, the communication device 400 may not include the processor 470. If the communication device 400 does not include any processor 470, the communication device 400 may operate under the control of a processor of another device in the vehicle 100 or under the control of the controller 170.

In some implementations, the communication device 400 may be configured as a vehicle display device, together with the UI device 200. In this case, the vehicle display device may be referred to as a telematics device or an Audio Video Navigation (AVN) device.

The communication device 400 may operate under the control of the controller 170.

The driving manipulation device 500 is a device used to receive a user command for driving the vehicle 100.

In the manual mode, the vehicle 100 may be driven based on a signal provided by the driving manipulation device 500.

The driving manipulation device 500 may include the steering input device 510, an acceleration input device 530, and a brake input device 570.

The steering input device 510 may receive a user command for steering the vehicle 100 from a user. The steering input device 510 is preferably configured as a wheel for enabling steering input by rotation thereof. In some implementations, the steering input device 510 may be configured as a touchscreen, a touchpad, or a button.

The acceleration input device 530 may receive a user command input for acceleration of the vehicle 100 from the user. The brake input device 570 may receive a user command for deceleration of the vehicle 100 from the user. The acceleration input device 530 and the brake input device 570 may be formed into pedals. In some implementations, the acceleration input device or the brake input device may be configured as a touchscreen, a touchpad, or a button.

The driving manipulation device 500 may operate under the control of the controller 170.

The vehicle driving device 600 is a device used to electrically control driving of various devices of the vehicle 100.

The vehicle driving device 600 may include at least one of a powertrain driving unit 610, a chassis driving unit 620, a door/window driving unit 630, a safety apparatus driving unit 640, a lamp driving unit 650, and an air conditioner driving unit 660.

In some implementations, the vehicle driving device 600 may further include a new component in addition to the above-described components or may not include a part of the above-described components.

In some implementations, the vehicle driving device 600 may include at least one processor. For example, each individual unit of the vehicle driving device 600 may include a processor.

The powertrain driving unit 610 may control operation of a powertrain device.

The powertrain driving unit 610 may include a power source driver 611 and a transmission driver 612.

The power source driver 611 may control a power source of the vehicle 100.

For example, if the power source is a fossil fuel-based engine, the power source driver 610 may perform electronic control of the engine. Therefore, the power source driver 610 may control an output torque of the engine, and the like. The power source driver 611 may adjust the engine output torque under the control of the controller 170.

For example, if the power source is an electrical energy-based motor, the power source driver 610 may control the motor. The power source driver 610 may adjust a rotation speed, torque, and so on of the motor under the control of the controller 170.

The transmission driver 612 may control a transmission.

The transmission driver 612 may adjust a state of the transmission. The transmission driver 612 may adjust the state of the transmission to drive D, reverse R, neutral N, or park P.

If the power source is an engine, the transmission driver 612 may adjust an engagement state of a gear in the drive state D.

The chassis driving unit 620 may control operation of a chassis device.

The chassis driving unit 620 may include a steering driver 621, a brake driver 622, and a suspension driver 623.

The steering driver 621 may perform electronic control of a steering apparatus in the vehicle 100. The steering driver 621 may change a driving direction of the vehicle 100.

The brake driver 622 may perform electronic control of a brake apparatus in the vehicle 100. For example, the brake driver 622 may decrease the speed of the vehicle 100 by controlling an operation of a brake disposed at a tire.

In some implementations, the brake driver 622 may control a plurality of brakes individually. The brake driver 622 may differentiate braking power applied to a plurality of wheels.

The suspension driver 623 may perform electronic control of a suspension device in the vehicle 100. For example, if the surface of a road is rough, the suspension driver 623 may control the suspension device to reduce vibration of the vehicle 100 when a road has an uneven surface.

In some implementations, the suspension driver 623 may control a plurality of suspensions individually.

The door/window driving unit 630 may perform electronic control of a door apparatus or a window apparatus in the vehicle 100.

The door/window driving unit 630 may include a door driver 631 and a window driver 632.

The door driver 631 may perform electronic control of a door apparatus in the vehicle 100. For example, the door driver 631 may control opening and closing of a plurality of doors in the vehicle 100. The door driver 631 may control opening or closing of the trunk or the tailgate. The door driver 631 may control opening or closing of the sunroof.

The window driver 632 may perform electronic control of a window apparatus in the vehicle 100. The window driver 632 may control opening or closing of a plurality of windows in the vehicle 100.

The safety apparatus driving unit 640 may perform electronic control of various safety apparatuses in the vehicle 100.

The safety apparatus driving unit 640 may include an airbag driver 641, a seatbelt driver 642, and a pedestrian protection device driver 643.

The airbag driver 641 may perform electronic control of an airbag apparatus in the vehicle 100. For example, the airbag driver 641 may control inflation of an airbag, upon sensing an emergency situation.

The seatbelt driver 642 may perform electronic control of a seatbelt apparatus in the vehicle 100. For example, the seatbelt driver 642 may control securing of passengers on the seats 110FL, 110FR, 110RL, and 110RR by means of seatbelts, upon sensing danger.

The pedestrian protection device driver 643 may perform electronic control of a hood lift and a pedestrian airbag in the vehicle 100. For example, the pedestrian protection device driver 643 may control hood lift-up and inflation of the pedestrian airbag, upon sensing collision with a pedestrian.

The lamp driving unit 650 may perform electronic control of various lamp apparatuses in the vehicle 100.

The air conditioner driver 660 may perform electronic control of an air conditioner in the vehicle 100. For example, if a vehicle internal temperature is high, the air conditioner driver 660 may control the air conditioner to operate and supply cool air into the vehicle 100.

The vehicle driving device 600 may include a processor. Each individual unit of the vehicle driving device 600 may include a processor.

The vehicle driving device 600 may operate under the control of the controller 170.

The operation system 700 is a system that controls various operations of the vehicle 100. The operation system 700 may operate in the autonomous mode.

The operation system 700 may include a driving system 710, a park-out system 740, and a park-in system 750.

In some implementations, the operation system 700 may further include a new component in addition to the above-described components or may not include a part of the above-described components.

In some implementations, the operation system 700 may include a processor. Each individual unit of the operation system 700 may include a processor.

In some implementations, if the operation system 700 is implemented in software, the operation system 700 may be implemented by the controller 170.

In some implementations, the operation system 700 may include at least one of the UI device 200, the object detection device 300, the communication device 400, the driving manipulation device 500, the vehicle driving device 600, and the controller 170.

The driving system 710 may control autonomous driving of the vehicle 100.

The driving system 710 may receive navigation information from the navigation system 770 and provide a control signal to the vehicle driving device 600, thereby driving the vehicle 100.

The driving system 710 may receive object information from the object detection device 300 and provide a control signal to the vehicle driving device 600, thereby driving the vehicle 100.

The driving system 710 may receive a signal from an external device through the communication device 400 and provide a control signal to the vehicle driving device 600, thereby driving the vehicle 100.

The driving system 710 may include at least one of the UI device 200, the object detection device 300, the communication device 400, the driving manipulation device 500, the vehicle driving device 600, the navigation system 770, the sensing unit 120 and the controller 170 to drive the vehicle 100.

The driving system 710 may also be referred to as a vehicle driving control device.

The park-out system 740 may control automatic park-out of the vehicle 100.

The park-out system 740 may receive navigation information from the navigation system 770 and provide a control signal to the vehicle driving device 600, so that the vehicle 100 may leave.

The park-out system 740 may receive object information from the object detection device 300 and provide a control signal to the vehicle driving device 600, so that the vehicle 100 may leave.

The park-out system 740 may receive a signal from an external device through the communication device 400 and provide a control signal to the vehicle driving device 600, so that the vehicle 100 may leave.

The park-out system 740 may include at least one of the UI device 200, the object detection device 300, the communication device 400, the driving manipulation device 500, the vehicle driving device 600, the navigation system 770, the sensing unit 120 and the controller 170, so that the vehicle 100 may leave.

The park-out system 740 may also be referred to as a vehicle part-out control device.

The park-in system 750 may control automatic park-in of the vehicle 100.

The park-in system 750 may receive navigation information from the navigation system 770 and provide a control signal to the vehicle driving device 600, so that the vehicle 100 may park.

The park-in system 750 may receive a signal from an external device through the communication device 400 and provide a control signal to the vehicle driving device 600, so that the vehicle 100 may park.

The park-in system 750 may receive object information from the object detection device 300 and provide a control signal to the vehicle driving device 600, so that the vehicle 100 may park.

The park-in system 750 may include at least one of the UI device 200, the object detection device 300, the communication device 400, the driving manipulation device 500, the vehicle driving device 600, the navigation system 770, the sensing unit 120 and the controller 170, so that the vehicle 100 may park.

The park-in system 750 may also be referred to as a vehicle park-in control device.

The navigation system 770 may provide navigation information. The navigation information may include at least one of map information, set destination information, path information, information about various objects on a road, lane information, and information about a location of a vehicle.

The navigation system 770 may include a memory and a processor. The memory may store navigation information. The processor may control operation of the navigation system 770.

In some implementations, the navigation system 770 may receive information from an external device through the communication device 400 and update pre-stored information using the received information.

In some implementations, the navigation system 770 may be classified as a lower-layer component of the UI device 200.

The sensing unit 120 may sense a state of the vehicle 100. The sensing unit 120 may include an inertial navigation unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a handle rotation-based steering sensor, a vehicle internal temperature sensor, a vehicle internal humidity sensor, an ultrasonic sensor, an illumination sensor, an accelerator pedal position sensor, a brake pedal position sensor, and so on.

In some implementations, an inertial navigation unit (IMU) sensor may include one or more of an acceleration sensor, a gyro sensor and a magnetic sensor.

The sensing unit 120 may acquire sensing signals for vehicle posture information, vehicle motion information, vehicle collision information, vehicle heading information, vehicle location information (GPS information), vehicle angle information, vehicle speed information, vehicle acceleration information, vehicle inclination information, vehicle forward/backward information, battery information, fuel information, tire information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and so on.

The sensing unit 120 may generate vehicle state information based on sensing data. The vehicle state information may be generated based on data sensed by various types of sensors provided in the vehicle.

For example, the vehicle state information may include vehicle posture information, vehicle speed information, vehicle inclination information, vehicle weight information, vehicle direction information, vehicle battery information, vehicle fuel information, vehicle tire pressure information, vehicle steering information, vehicle interior temperature information, vehicle interior humidity information, pedal position information and vehicle engine temperature information.

The interface unit 130 serves as paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

In some implementations, the interface unit 130 may serve as a path in which electric energy is supplied to a connected mobile terminal. For example, if the mobile terminal is electrically connected to the interface unit 130, the interface unit 130 may supply electric energy received from the power supply 190 to the mobile terminal under the control of the controller 170.

The memory 140 is electrically connected to the controller 170. The memory 140 may store basic data of a unit, control data for controlling an operation of the unit, and input and output data. The memory 140 may be any of various storage devices in hardware, such as Read Only Memory (ROM), Random Access Memory (RAM), Erasable and Programmable ROM (EPROM), flash drive, and hard drive. The memory 140 may store a variety of data for overall operations of the vehicle 100, such as programs for processing or controlling in the controller 170.

In some implementations, the memory 140 may be integrated with the controller 170, or configured as a lower-layer component of the controller 170.

The controller 170 may provide overall control to each unit inside the vehicle 100. The controller 170 may be referred to as an Electronic Control Unit (ECU).

The power supply 190 may supply power needed for operating each component under the control of the controller 170. Particularly, the power supply 190 may receive power from a battery within the vehicle 100.

One or more processors and the controller 170 of the vehicle 100 may be implemented in hardware using at least one of Application Specific Integrated Circuits (ASICs), Digital Signal Processors (DSPs), Digital Signal Processing Device (DSPDs), Programmable Logic Devices (PLDs), Field Programmable Gate Arrays (FPGAs), processors, controllers, microcontrollers, microprocessors, and an electrical unit for executing other functions.

Figure 8A:
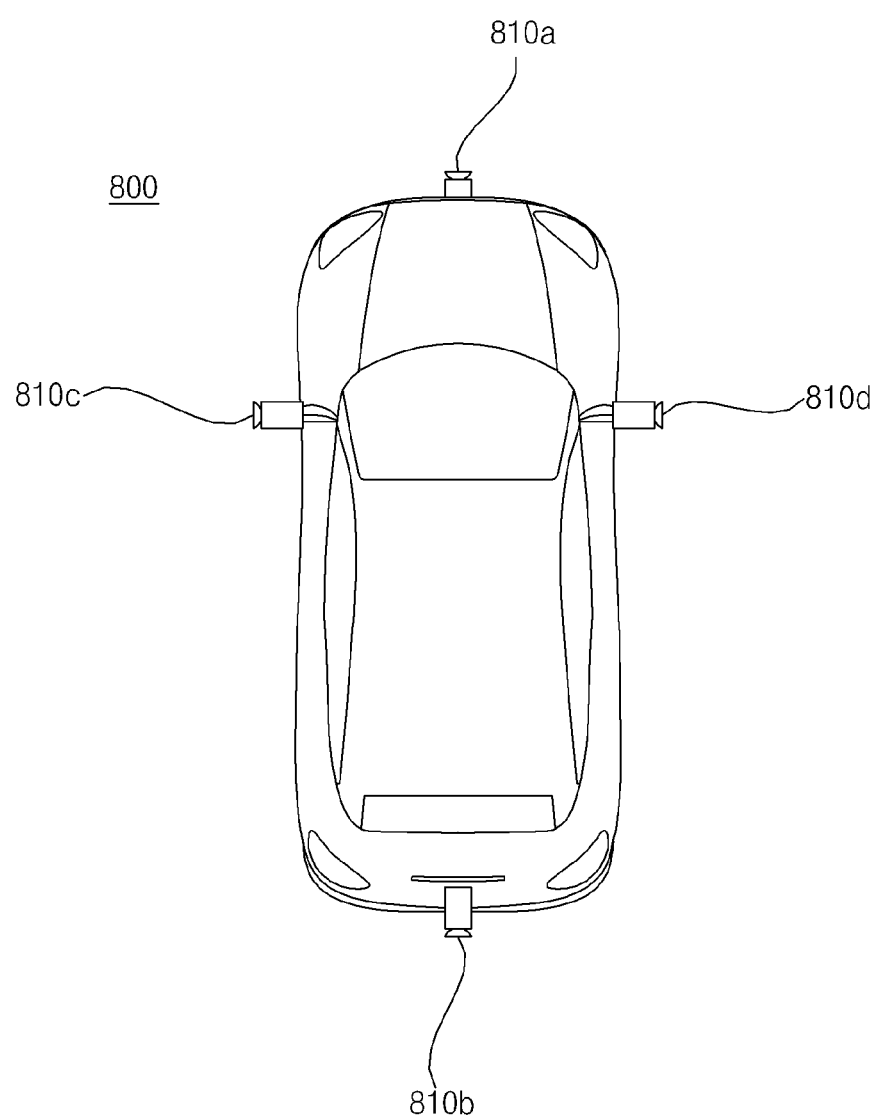
FIG. 8A is a diagram illustrating a plurality of cameras included in an example around view monitoring apparatus for a vehicle according to an implementation.

FIG. 8A is a diagram illustrating a plurality of cameras included in an example around view monitoring apparatus for a vehicle according to an implementation.

Referring to FIG. 8A, the around view monitoring apparatus 800 for the vehicle may include a plurality of cameras 810.

In FIG. 8A, the around view monitoring apparatus 800 for the vehicle includes four cameras 810a, 810b, 810c, 810d. The around view monitoring apparatus 800 for the vehicle may include less than four cameras or more than four cameras.

The plurality of cameras 810a, 810b, 810c and 810d may be attached to at least one of a moving part and a fixed part of the vehicle.

The moving part of the vehicle refers to a movable part among parts of the vehicle forming the appearance and frame of the vehicle. For example, the moving part of the vehicle may include a side-view mirror, a door, a sunroof, a wiper, a bonnet (or hood), a wheel and a window.

The fixed part of the vehicle refers to a non-movable part among parts of the vehicle forming the appearance and frame of the vehicle. For example, the fixed part of the vehicle may include a bumper, a grill, a fender, a wheelhouse, a roof and a windshield.

The plurality of cameras 810 may include, for example, a front camera 810a, a rear camera 810b, a left camera 810c and a right camera 810d.

The front camera 810a may acquire a front image of the vehicle 100.

The front camera 810a may be attached, for example, to a front bumper as a fixed part. The front camera 810a may be provided, for example, inside the grill.

The rear camera 810b may acquire a rear image of the vehicle 100.

The rear camera 810b may be attached, for example, to a back door as a moving part. The back door may include a trunk and a tailgate.

The rear camera 810b may be attached, for example, to a rear bumper as a fixed part.

The left camera 810c may acquire a left image of the vehicle 100.

The left camera 810c may be attached, for example, to a left side-view mirror as a moving part. Here, the left side-view mirror may include a mirror, various electric parts, a case surrounding the mirror and the electric parts, etc. The left side-view mirror may be referred to as a left side-view mirror module.

The left camera 810c may be attached, for example, to a left front door as a moving part. The left front door may include a left side-view mirror.

The right camera 810d may acquire a right image of the vehicle.

The right camera 810d may be attached, for example, to a right side-view mirror as a moving part. Here, the right side-view mirror may include a mirror, various electric parts, a case surrounding the mirror and the electric parts, etc. The right side-view mirror may be referred to as a right side-view mirror module.

The right camera 810d may be attached, for example, to a right front door as a moving part. The right front door may include a right side-view mirror.

Figure 8B:
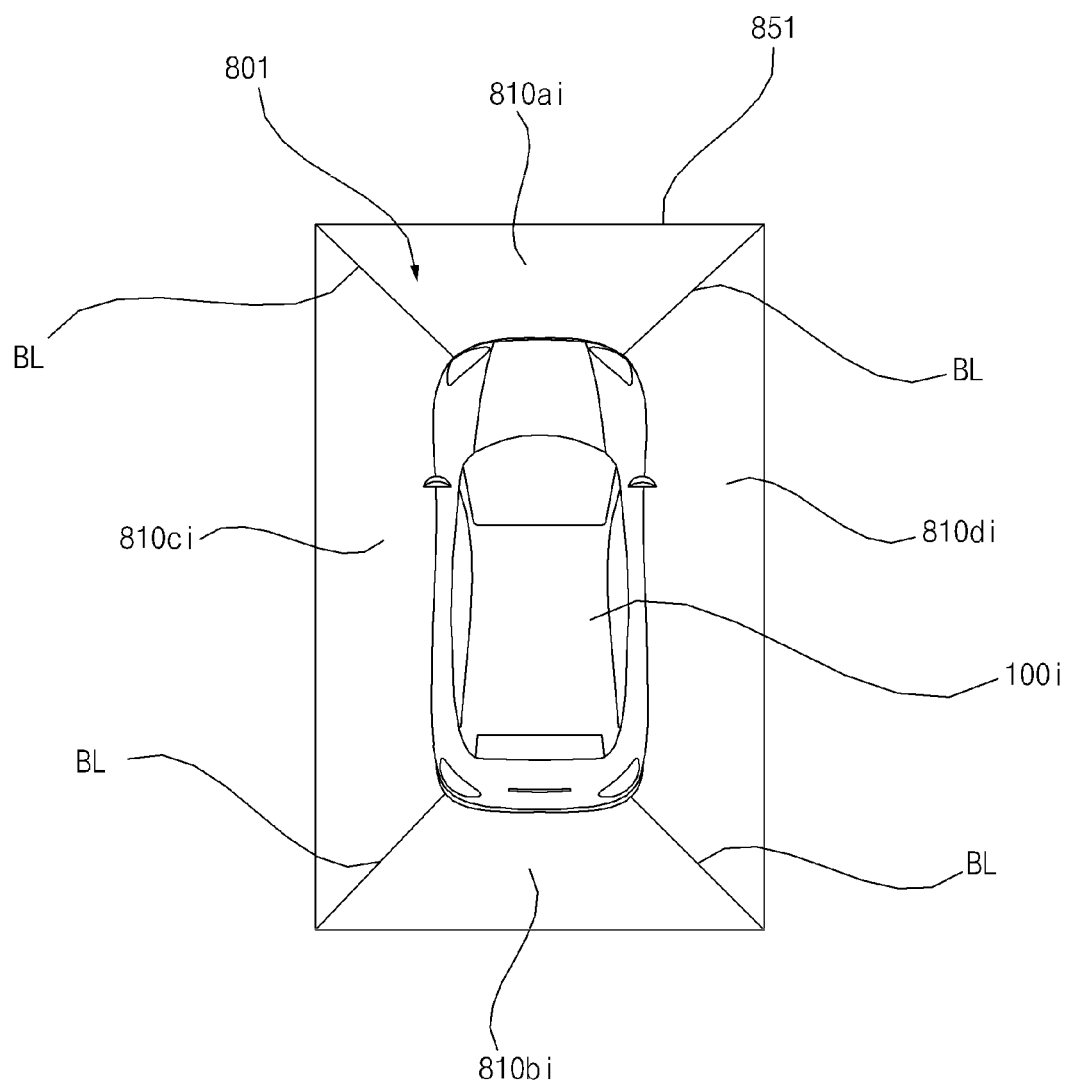
FIG. 8B is a diagram illustrating an implementation of an around view image generated by an around view monitoring apparatus for a vehicle according to an implementation.

FIG. 8B is a diagram illustrating an implementation of an around view image generated by an around view monitoring apparatus for a vehicle according to an implementation.

Referring to FIG. 8B, the around view monitoring apparatus 800 for the vehicle may generate an around view image 801.

The at least one processor, such as the processor 870, of the around view monitoring apparatus 800 for the vehicle may combine a plurality of images acquired by the plurality of cameras 810 to generate the around view image 801.

For example, the processor 870 of the around view monitoring apparatus 800 for the vehicle may combine a front image acquired by the front camera 810a, a rear image acquired by the rear camera 810b, a left image acquired by the left camera 810c, and a right image acquired by the right camera 810d to generate the around view image 801.

In some implementations, the around view image 801 may include at least one of a top-view image, a side-view image, a front-view image, or a rear-view image.

In some implementations, the around view image 801 may be implemented by a 2D image or a 3D image.

The around view image 801 may include a border line BL. The border line BL may refer to a line for dividing regions corresponding to the plurality of images acquired by the plurality of cameras 810 in the around view image 801.

For example, the around view image 801 may include a first region 810ai, a second region 810bi, a third region 810ci and a fourth region 810di.

The first region 811i may correspond to the front image. The second region 812i may correspond to the rear image. The third region 813i may correspond to the left image. The fourth region 814i may correspond to the right image.

The around view image 801 may include a vehicle image 100i corresponding to the vehicle 100.

Figure 9:
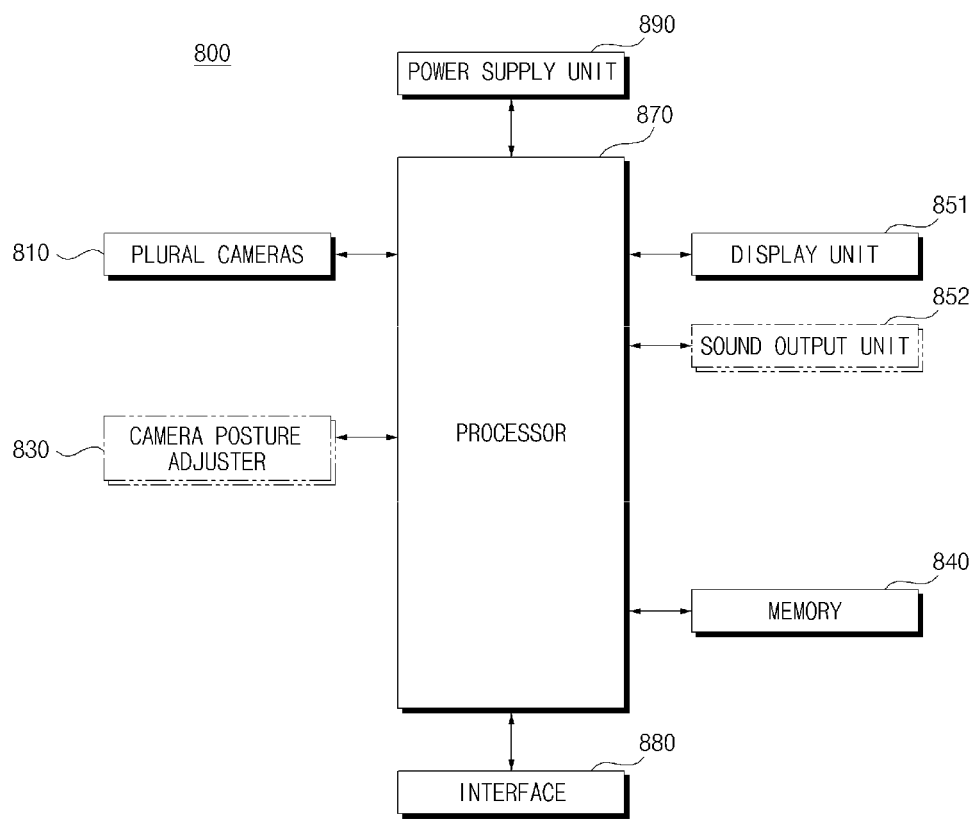
FIG. 9 is a block diagram illustrating an around view monitoring apparatus for a vehicle according to an implementation.

FIG. 9 is a block diagram illustrating an around view monitoring apparatus for a vehicle according to an implementation.

Referring to FIG. 9, the around view monitoring apparatus 800 for the vehicle may include the plurality of cameras 810, a memory 840, a display unit 851, at least one processor 870 and a power supply unit 890.

In some implementations, the around view monitoring apparatus 800 for the vehicle may further include an auxiliary camera 820, a camera posture adjuster 830, a sound output unit 852 or a combination thereof.

The plurality of cameras 810 may be attached to the vehicle 100. For example, the plurality of cameras 810 may be attached to at least one of the moving part or the fixed part of the vehicle.

Each of the plurality of cameras 810 may include a lens unit and an image sensor.

One or more of the plurality of cameras 810 may include a lens unit configured to form different focal lengths for two or more regions included in the acquired image.

An image acquired by any one of the plurality of cameras 810 may include a first region having a first angle of view, e.g., a relatively narrow angle, and a second region having a second angle of view, e.g., a relative wide angle in relation to the first angle of view.

Each of the plurality of cameras 810 may include an image sensor.

One or more of the plurality of cameras 810 may include an image sensor that includes two or more pixel arrays formed to correspond to two or more regions. The image sensor may convert light input to the two or more pixel arrays through the lens unit into an electrical signal.

In some implementations, the two or more pixel arrays may have different pixel densities.

The camera posture adjuster 830 may control the posture of each of the plurality of cameras 810. The camera posture adjuster 830 may include, for example, a plurality of drive units corresponding in number to the plurality of cameras 810. The drive unit may include, for example, a driving power generation unit such as a motor, an actuator or a solenoid.

In some implementations, the camera posture adjuster 830 may include a first drive unit corresponding to the left camera 810c, a second drive unit corresponding to the right camera 810d, a third drive unit corresponding to the rear camera 810b, and a fourth drive unit corresponding to the front camera 810a.

The camera posture adjuster 830 may adjust the posture of the camera attached to the moving part based on motion information of the moving part, under control of the processor 870.

The memory 840 is electrically connected to the processor 870. The memory 840 may store basic data for a unit, control data for operation control of the unit, and input/output data. The memory 840 may be various hardware storage devices such as a ROM, a RAM, an EPROM, a flash drive and a hard drive. The memory 840 may store a variety of data for overall operation of the around view monitoring apparatus 800 for the vehicle, such as programs for processing or control of the processor 870.

In some implementations, the memory 840 may be integrated with the processor 870, or configured as a subcomponent of the processor 870.

The display unit 851 may display the around view image under control of the processor 870.

The display unit 851 may be integrated with the display unit 251 of the UI device 200.

The display unit 851 may be referred to as an AVN (Audio Video Navigation) device, a CID (Center Information Display), a head unit, etc.

In some implementations, the display unit 851 may be combined with the communication unit 400 and thus may be implemented as a telematics device.

The sound output unit 852 may output an audio signal under control of the processor 870.

The sound output unit 852 may be integrated with the audio output unit 252 of the UI device 200.

The display unit 851 and the sound output unit 852 may be configured as lower-layer components of the output unit of the around view monitoring apparatus for the vehicle.

The processor 870 may be electrically connected to the units of the around view monitoring apparatus 800 for the vehicle.

The processor 870 may control overall operation of the units of the around view monitoring apparatus 800 for the vehicle. The processor 870 may be two or more processors.

The processor 870 may be implemented in hardware using at least one of Application Specific Integrated Circuits (ASICs), Digital Signal Processors (DSPs), Digital Signal Processing Devices (DSPDs), Programmable Logic Device (PLDs), Field Programmable Gate Arrays (FPGAs), processors, controllers, microcontrollers, microprocessors, and an electrical unit for executing other functions.

The processor 870 may receive the images from the plurality of cameras 810.

For example, the processor 870 may receive the front image from the front camera 810*a*.

For example, the processor 870 may receive the rear image from the rear camera 810*b*.

For example, the processor 870 may receive the left image from the left camera 810*c*.

For example, the processor 870 may receive the right image from the right camera 810*c*.

The processor 870 may process the plurality of images acquired by the plurality of cameras 810.

The processor 870 may combine the plurality of images acquired by the plurality of cameras 810 to generate the around view image.

The around view image may include at least one of a top-view image, a side-view image, a front-view image, and a rear-view image.

In some implementations, the image received from at least one of the plurality of cameras 810 may include a first region having a relatively narrow angle and a second region having a relative wide angle.

The processor 870 may divide and process the first region and the second region.

The processor 870 may generate a narrow-angle image based on the first image.

The processor 870 may synthesize the first region and the second region based on a mapping function to generate a wide-angle image.

The processor 870 may provide the narrow-angle image and the wide-angle image to one or more devices inside the vehicle through the interface 880.

The processor 870 may alternately provide the narrow-angle image and the wide-angle image to other devices inside the vehicle through one cable.

The processor 870 may alternately provide the narrow-angle image and the wide-angle image to a device in frame or slice units.

In some implementations, the slice may be defined as a unit region divided from a full image based on a predetermined criterion.

For example, the processor 870 may transmit a first frame of the narrow-angle image in a first time range. The processor 870 may transmit a first frame of the wide-angle image in a second time range. The processor 870 may transmit a second frame of the narrow-angle image in a third time range. The processor 870 may transmit a second frame of the wide-angle image in a fourth time range. Thereafter, the processor 870 may alternately transmit the narrow-angle image and the wide-angle image in frame units.

For example, the processor 870 may transmit a first slice of the narrow-angle image in a first time range. The processor 870 may transmit a first slice of the wide-angle image in a second time range. The processor 870 may transmit a second slice of the narrow-angle image in a third time range. Thereafter, the processor 870 may alternately transmit the narrow-angle image and the wide-angle image in slice units.

The processor 870 may transmit the narrow-angle image and the wide-angle image to other devices inside the vehicle using two cables.

The processor 870 may provide the narrow-angle image through a first port of the interface 880.

The processor 870 may transmit the narrow-angle image through the first port in frame units or slice units.

The processor 870 may provide the wide-angle image through a second port of the interface 880.

The processor 870 may transmit the wide-angle image through the second port in frame units or slice units.

The processor 870 may control the display unit 851 to display the image based on the narrow-angle image and the wide-angle image.

For example, the processor 870 may control the display unit 851 to display the around view image based on the plurality of the wide-angle images.

For example, the processor 870 may control the display unit 851 to display an e-mirror image based on the rear narrow-angle image. The e-mirror image may be an image viewed through a rear-view mirror or a side-view mirror to enable a user to recognize a rear state of the vehicle. For example, the e-mirror image may be generated based on the image acquired by the rear camera 810*b*. As another example, the e-mirror image may be generated based on the images acquired by the left camera 810*c* and the right camera 810*d*.

The processor 870 may detect an object based on the narrow-angle image. The processor 870 may generate information on the object based on the narrow-angle image. The processor 870 may provide the information on the object to another device.

The processor 870 may detect the object based on the wide-angle image. The processor 870 may generate the information on the object based on the wide-angle image. The processor 870 may provide the information on the object to another device.

The interface 880 may exchange information, signals or data with one or more devices included in the vehicle 100.

The devices included in the vehicle 100 may include the UI device 200, the object detection device 300, the communication unit 400, the driving manipulation device 500, the vehicle driving device 600, the operation system 700, the navigation system 770, the sensing unit 120, the memory 140, the controller 170, and the power supply unit 190.

The interface 880 may receive information, signals and data from another device included in the vehicle 100.

The interface 880 may transmit the received information, signals or data to the processor 870.

The interface 880 may transmit the information, signals or data generated or processed by the processor 870 to another device included in the vehicle 100.

The interface 880 may include the first port and the second port.

The first port may be connected to a first cable.

The second port may be connected to a second cable.

The power supply unit 890 may supply power necessary for operation of each component under control of the processor 870. In particular, the power supply unit 890 receives power from the battery inside the vehicle.

Figure 10:
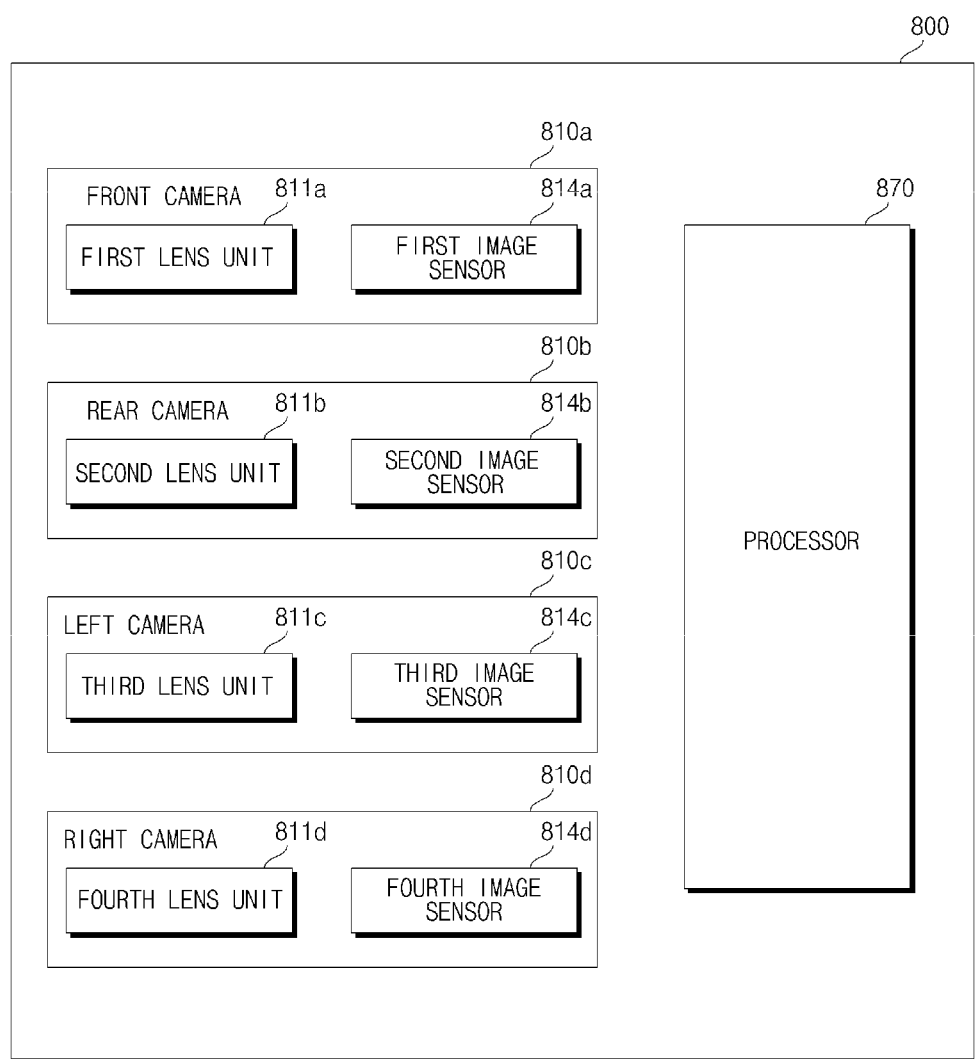
FIG. 10 is a block diagram illustrating an around view monitoring apparatus for a vehicle according to an implementation.

FIG. 10 is a block diagram illustrating an around view monitoring apparatus for a vehicle according to an implementation.

In particular, although the plurality of cameras 810 and the processor 870 are focused upon in FIG. 10, as described with reference to FIG. 9, the around view monitoring apparatus 800 for the vehicle may further include components other than the plurality of cameras 810 and the processor 870.

Referring to FIG. 10, the plurality of cameras 810 may include the front camera 810a, the rear camera 810b, the left camera 810c and the right camera 810d.

The front camera 810a may include a first lens unit 811a and a first image sensor 814a.

The front camera 810a may be mounted in the vehicle 100 to face the front side of the vehicle 100. That is, unlike the related art, the front camera 810a does not face a front road surface.

The first lens unit 811a may form different focal lengths in the central region and the peripheral region of the front image.

The first image sensor 814a may convert an optical signal into an electrical signal.

The first image sensor 814a may include a first pixel array corresponding to the central region of the front image and a second pixel array corresponding to the peripheral region of the front image.

The pixel density of the first pixel array may be different from that of the second pixel array.

The first image sensor 814a may be provided perpendicular to the ground.

In some implementations, the vertical angle of view of the front image may be equal to the horizontal angle of view thereof.

The processor 870 may receive the front image from the front camera 810a.

The processor 870 may perform lens distortion correction with respect to the front image.

If the focal lengths of the central region and the peripheral region are different from each other, image distortion may be increased from the central region toward the peripheral region. As such, the processor 870 may apply lens distortion correction for correcting a distorted image to perform distortion correction.

The rear camera 810b may include a second lens unit 811b and a second image sensor 814b.

The rear camera 810b may be mounted in the vehicle 100 to face the rear side of the vehicle 100. That is, unlike the related art, the rear camera 810b does not have to be aimed toward a rear road surface.

The second lens unit 811b may enable the focal length of the whole region of the acquired image to be constant.

In some implementations, the vertical angle of view of the rear image may be equal to the horizontal angle of view thereof.

The second image sensor 814b may convert an optical signal into an electrical signal.

The second image sensor 814b may be provided perpendicular to the ground.

The processor 870 may receive the rear image from the rear camera 810b.

The left camera 810c may include a third lens unit 811c and a third image sensor 814c.

The left camera 810c may be mounted in the vehicle 100 to face the left side of the vehicle 100. That is, unlike the related art, the left camera 810c does not have to be aimed toward a left road surface.

The third lens unit 811c may enable the focal lengths of the right region and the left region of the left image to be different from each other.

Alternatively, the third lens unit 811c may enable the focal lengths of the central region and the peripheral region of the left image to be different from each other.

The third image sensor 814c may include a third pixel array corresponding to the right region of the left image and a fourth pixel array corresponding to the left region of the left image.

Alternatively, the third image sensor 814c may include a third pixel array corresponding to the central region of the left image and a fourth pixel array corresponding to the peripheral region of the left image.

The pixel density of the third pixel array may be different from that of the fourth pixel array.

The third image sensor 814c may be provided perpendicular to the ground.

The processor 870 may receive the left image from the left camera 810c.

The right camera 810d may include a fourth lens unit 811d and a fourth image sensor 814d.

The right camera 810d may be mounted in the vehicle 100 to face the right side of the vehicle 100. That is, unlike the related art, the right camera 810d does not have to be aimed toward a right road surface.

The fourth lens unit 811d may enable the focal lengths of the right region and the left region of the right image to be different from each other.

Alternatively, the fourth lens unit 811d may enable the focal lengths of the central region and the peripheral region of the right image to be different from each other.

The fourth image sensor 814d may include a fifth pixel array corresponding to the left region of the right image and a sixth pixel array corresponding to the right region of the right image.

Alternatively, the fourth image sensor 814d may include a fifth pixel array corresponding to the central region of the right image and a sixth pixel array corresponding to the peripheral region of the right image.

The pixel density of the fifth pixel array may be different from that of the sixth pixel array.

The fourth image sensor 814d may be provided perpendicular to the ground.

The processor 870 may receive the right image from the right camera 810d.

Figure 11A:
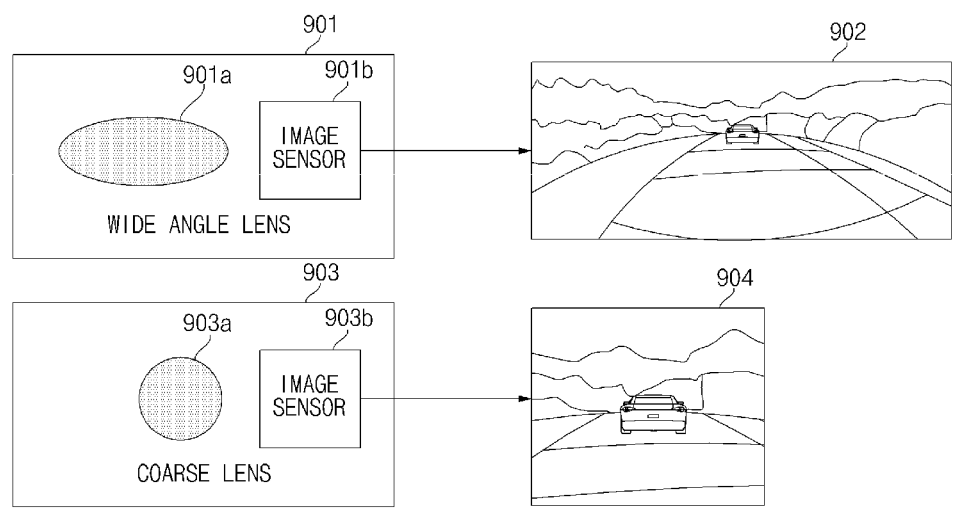
FIG. 11A is a diagram referenced to describe an example operation of an around view monitoring apparatus for a vehicle.

FIG. 11A is a diagram referenced to describe an example operation of an around view monitoring apparatus for a vehicle.

Figure 11B:
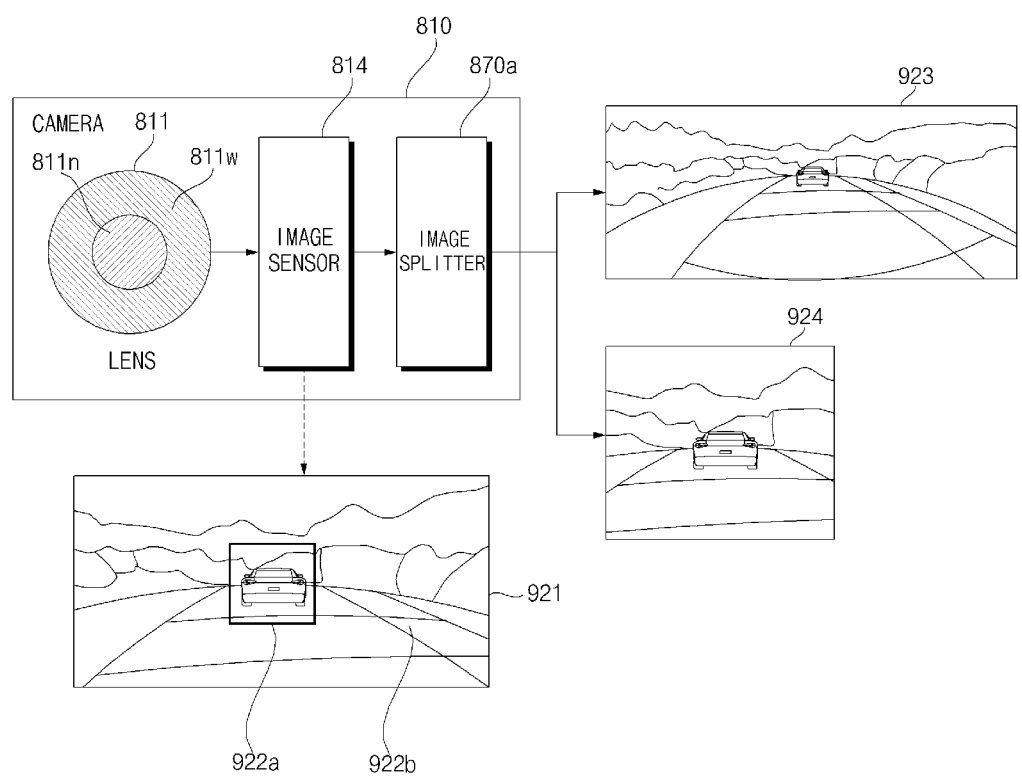
FIGS. 11B-11C are diagrams referenced to describe operation of an around view monitoring apparatus for a vehicle according to an implementation.
Figure 11C:
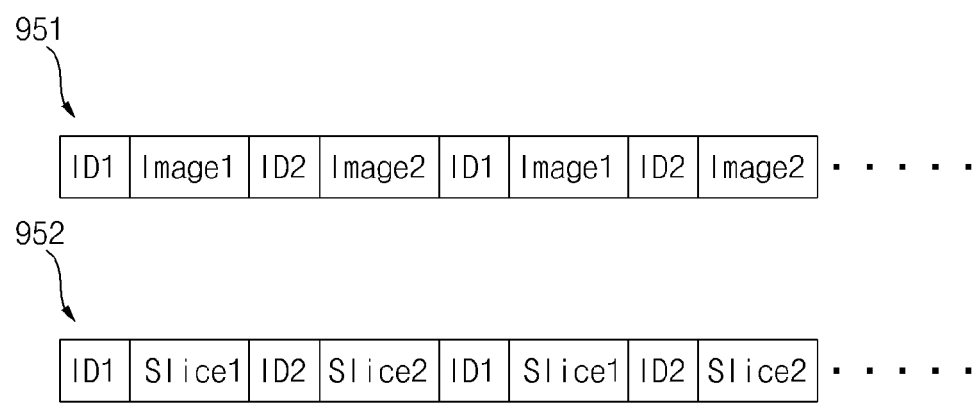

FIGS. 11B-11C are diagrams referenced to describe operation of an around view monitoring apparatus for a vehicle according to an implementation.

Referring to FIG. 11A, the vehicle according to the related art individually includes a camera for the purpose of acquiring an image.

The vehicle includes a front camera 901 of an around view monitoring apparatus and an object detection camera 903 as a camera for acquiring a front image.

The front camera 901 of the around view monitoring apparatus may include a wide-angle lens 901a and an image sensor 901b. The vertical angle of view of the wide-angle lens 901a is a wide angle. The front camera 901 of the around view monitoring apparatus acquires the wide-angle image 902.

The object detection camera 903 includes a narrow-angle lens 903a and an image sensor 903b. The object detection camera 903 acquires the narrow-angle image 904.

The plurality of cameras provided in the vehicle according to the related art captures the images of the same subject and acquires the wide-angle image 902 and the narrow-angle image 904 according to purposes.

The cameras provided in the vehicle according to the related art require an internal space of the vehicle where the cameras are mounted and a plurality of cables. In addition, cost may increase due to the inclusion of additional cameras.

FIG. 11B is a diagram referenced to describe a camera according to an implementation.

Referring to FIG. 11B, at least one of the plurality of cameras 810 may include a lens unit 811 configured to form, in each of the acquired images, a first focal length in a first region and a second focal length different from the first focal length in a second region.

The lens unit 811 may include a first region (e.g., central region) 811n and a second region (e.g., peripheral region) 811w.

The first region 811n may be a region for acquiring an image of an object located at a relatively long distance from the vehicle 100. For example, the first region 811n may be a region for acquiring an image of an object located at a distance of 80 m or more from the vehicle 100. As such, the first region 811n may be a far field region.

Typically, the focal length of the lens for acquiring the image of the object located at a long distance should be greater than that of the lens for acquiring the object located at a short distance. As such, the focal length of the first region 811n of the lens unit 811 may be greater than that of the second region 811w of the lens unit 811.

The second region 811w may be a region for acquiring the image of an object located at a relatively short distance from the vehicle 100. For example, the second region 811w may be a region for acquiring the image of an object located at a distance of 80 m or less from the vehicle 100. As such, the second region 811w may be a near field region.

The focal length of the lens 811 in the second region 811w may be less than that of the lens unit 811 in the first region 811n. The focal length of the lens for acquiring the image of the object located at a short distance should be less than that of the lens for acquiring the object located at a long distance.

An image 921 acquired by at least one of the plurality of cameras 810 may include a first region 922a and a second region 922b.

The first region 922a may have a narrower angle than the second region 922b. The first region 922a may be a central region of the image 921.

The second region 922a may have a wider angle than the first region 922a. The second region 922a may be a peripheral region of the image 921.

At least one of the plurality of cameras 810 may include an image sensor 814 including two or more pixel arrays formed in correspondence with two or more regions.

For example, the image sensor 814 may include a first pixel array and a second pixel array.

For example, the first pixel array may be a central pixel array.

For example, the second pixel array may be a peripheral pixel array.

The pixel array may be defined as a group of a plurality of pixels arranged in a plane.

The first pixel array may correspond to the first region 922a of the image 921.

The first pixel array may correspond to the first region 811n of the lens 811.

The first pixel array may convert light received by the first region 811n of the lens 811 into an electrical signal.

The second pixel array may correspond to the second region 922b of the image 921.

The second pixel array may correspond to the second region 811w of the lens 811.

The second pixel array may convert light received by the second region 811w of the lens 811 into an electrical signal.

In some implementations, the processor 870 may include an image splitter 870a.

The image splitter 870a may separate the image 921 into separate regions, and process the first region 922a and the second region 922b of the image 921.

The image splitter 870a may generate the narrow-angle image 924 based on the first region 922a.

The image splitter 870a may synthesize the first region 922a and the second region 922b based on a mapping function to generate the wide-angle image.

FIG. 11C illustrates various implementations of an image transferring operation by the processor.

Referring to FIG. 11C, the processor 870 may provide the narrow-angle image and the wide-angle image to another device in the vehicle 100 through the interface 880.

The processor 870 may provide the narrow-angle image and the wide-angle image through a single cable.

In this case, the processor 870 may split a time to alternately provide the narrow-angle image and the wide-angle image.

For example, the processor 870 may transmit the narrow-angle image in a first time range, transmit the wide-angle image in a second time range, transmit the narrow-angle image in a third time range, and transmit the wide-angle image in a fourth time range.

The processor 870 may transmit the narrow-angle image and the wide-angle image in frame units.

The processor 870 may transmit an ID in a header.

As shown by reference numeral 951, the processor 870 may alternate between transmitting the frame of the narrow-angle image and the frame of the wide-angle image.

As shown by reference numeral 952, the processor 870 may alternate between transmitting the slice of the narrow-angle image and the slice of the wide-angle image.

The processor 870 may provide the narrow-angle image and the wide-angle image through two cables.

The interface 880 may include a first port and a second port.

The first port may be connected to a first cable and the second port may be connected to a second cable.

The processor 870 may transmit the narrow-angle image through the first cable and transmit the wide-angle image through the second cable.

Figure 12A:
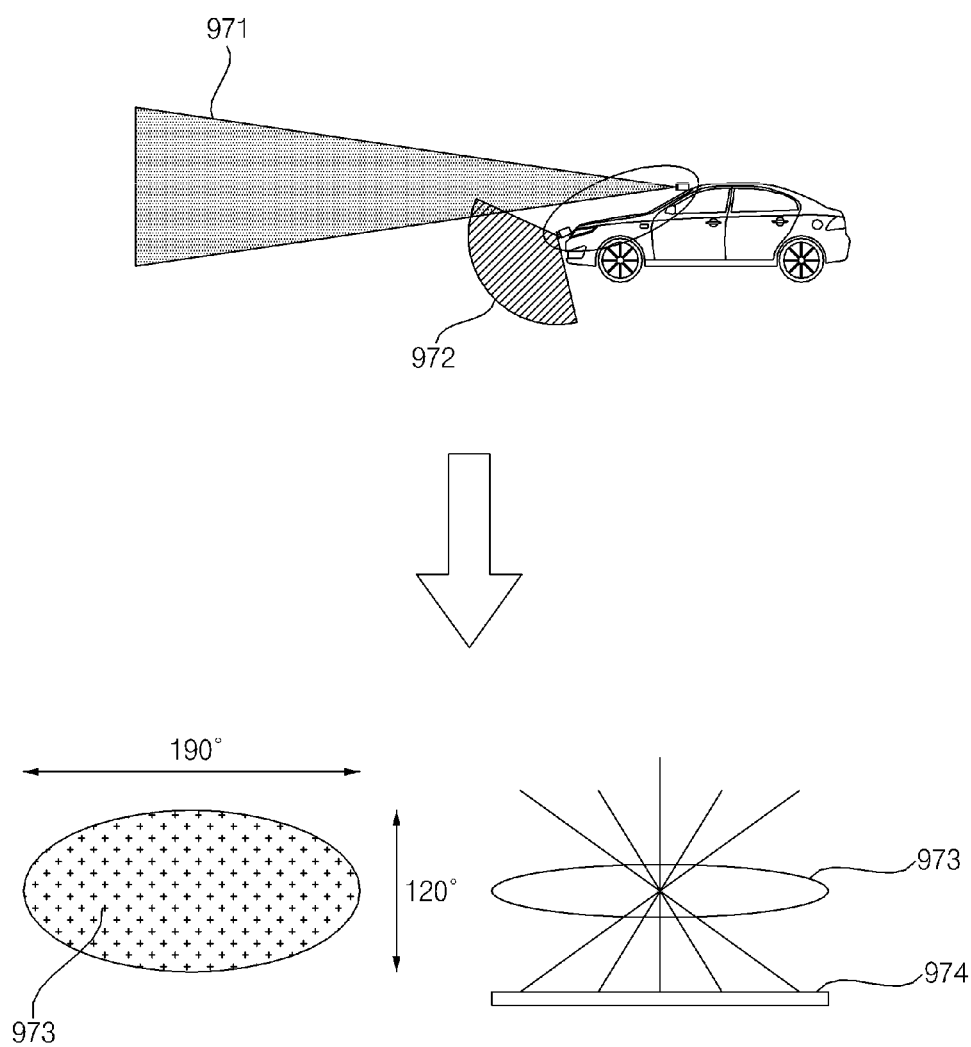
FIG. 12A is a diagram referenced to describe an example operation of a front camera of an around view monitoring apparatus for a vehicle.

FIG. 12A is a diagram referenced to describe an example operation of a front camera of an around view monitoring apparatus for a vehicle.

Referring to FIG. 12A, the vehicle according to the related art includes a plurality of cameras for the purpose of acquiring images.

The vehicle according to the related art includes a camera for capturing an image in a first range 971 and a camera for capturing an image in a second range 972.

The camera for capturing the image in the first range 971 may be an object detection camera.

The camera for capturing the image in the second range 972 may be a front camera of an around view monitoring apparatus.

The front camera of the around view monitoring apparatus is mounted in the vehicle to face a road surface.

The front camera of the around view monitoring apparatus may include a lens 973 and an image sensor 974.

The lens 973 has a wide angle in a horizontal direction.

The front camera of the around view monitoring apparatus acquires a wide-angle image in the horizontal direction.

Figure 12B:
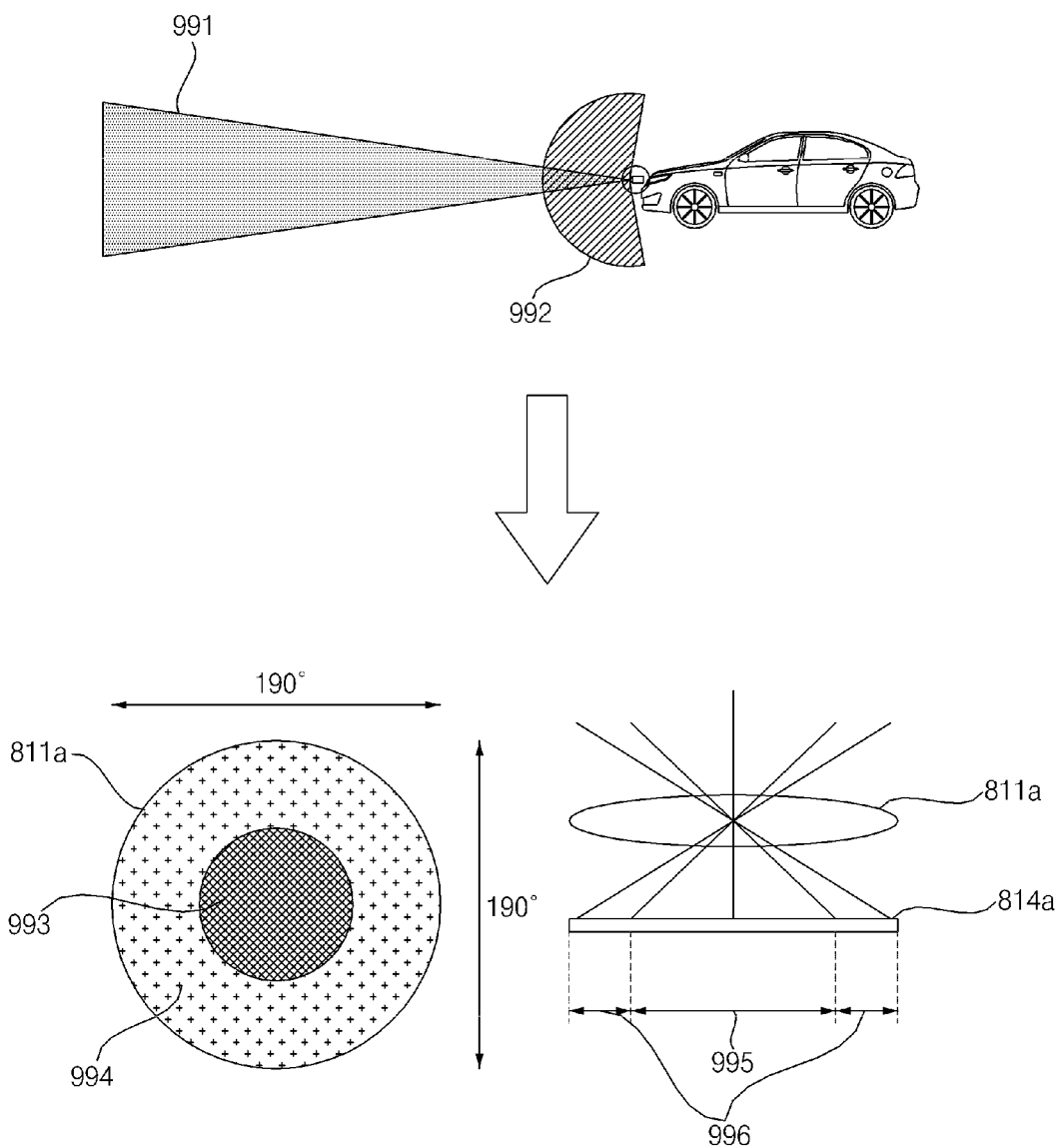
FIG. 12B is a diagram referenced to describe an example operation of a front camera of an around view monitoring apparatus for a vehicle according to an implementation.

FIG. 12B is a diagram referenced to describe an example operation of a front camera of an around view monitoring apparatus for a vehicle according to an implementation.

Referring to FIG. 12B, the front camera 810a may be mounted in the vehicle 100 to face forward.

The front camera 810a may generate the image in the first range 991 and the second range 992.

The image in the first range 991 serves to detect an object and the image in the second range 992 serves to provide an around view image.

The first range 991 may correspond to a far field, and the second range 992 may correspond to a near field.

The front camera 810a may include a first lens unit 811a and a first image sensor 814a.

The lens unit 811a may form different focal lengths in a first region (e.g., central region) and a second region (e.g., peripheral region) of the front image.

The first region of the front image may be an image acquisition region in the far field.

The second region of the front image may be an image acquisition region in the near field.

The first lens unit 811a may include a first region 993 and a second region 994.

The first region 993 may be a region for acquiring an image located at a relatively long distance.

The first region 994 may be a region for acquiring an image located at a relatively short distance.

The focal length of the first region 993 of the first lens unit 811a may be greater than that of the second region 994 of the first lens unit 811a.

The focal length of the second region 994 of the first lens unit 811a may be less than that of the first region 993 of the first lens unit 811a.

The first image sensor 814a may include a first pixel array 995 and a second pixel array 996.

The pixel array may be defined as a group of a plurality of pixels arranged in a plane.

The first pixel array 995 may correspond to the central region of the front image.

The first pixel array 995 may correspond to the first region 993 of the first lens unit 811a.

The first pixel array 995 may be a central pixel array.

The second pixel array 996 may correspond to the peripheral region of the front image.

The second pixel array 996 may correspond to the second region 994 of the first lens unit 811a.

The second pixel array 996 may be a peripheral pixel array.

The pixel density of the first pixel array 995 may be different from that of the second pixel array 996

The pixel density of the first pixel array 995 may be greater than that of the second pixel array 996.

The pixel density of the second pixel array 996 may be less than that of the first pixel array 995.

In some implementations, the pixel density may be defined as a pixel per unit angle of view. Alternatively, the pixel density may be defined as a pixel per unit area.

Figure 13A:
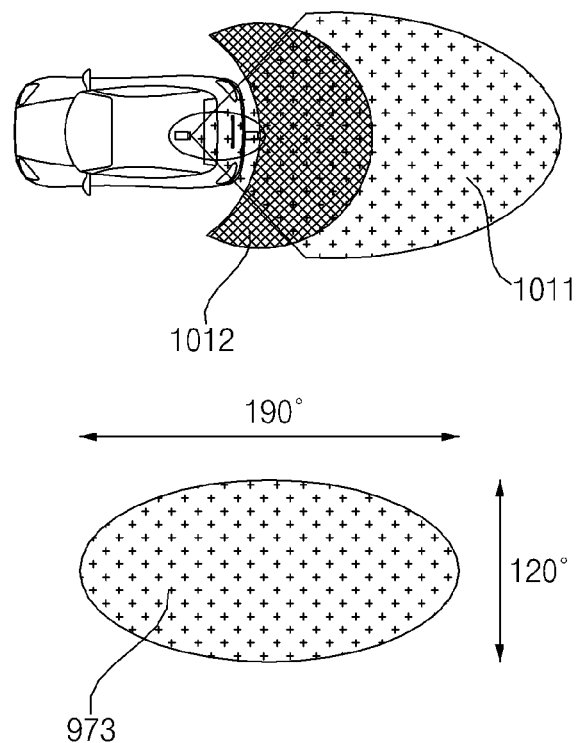
FIG. 13A is a diagram referenced to describe an example operation of a rear camera of an around view monitoring apparatus for a vehicle.

FIG. 13A is a diagram referenced to describe an example operation of a rear camera of an around view monitoring apparatus for a vehicle.

Referring to FIG. 13A, the vehicle according to the related art includes a plurality of cameras for the purpose of acquiring images.

The vehicle according to the related art includes a camera for capturing an image in a first range 1011 and a camera for capturing an image in a second range 1012.

The camera for capturing the image in the second range 1012 may be a rear camera of an around view monitoring apparatus.

The camera for capturing the image in the first range 1011 may be a camera for outputting a rear-view image.

The rear camera of the around view monitoring apparatus is mounted in the vehicle to face a road surface.

The rear camera of the around view monitoring apparatus may include a lens 1013 and an image sensor.

The lens 1013 has a wide angle in a horizontal direction.

The rear camera of the around view monitoring apparatus acquires the wide-angle image in the horizontal direction.

Figure 13B:
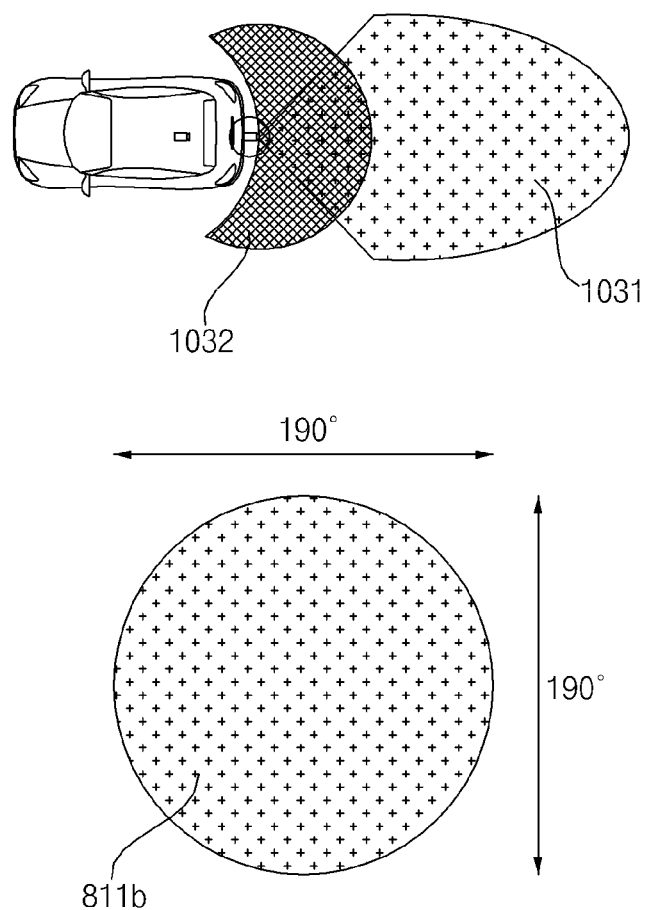
FIG. 13B is a diagram referenced to describe an example operation of a rear camera of an around view monitoring apparatus for a vehicle according to an implementation.

FIG. 13B is a diagram referenced to describe an example operation of a rear camera of an around view monitoring apparatus for a vehicle according to an implementation.

Referring to FIG. 13B, the rear camera 810b may be mounted in the vehicle 100 to face backward.

The rear camera 810b may generate the image in a first range 1031 and a second range 1032.

The image in the first range 1031 is to provide a rear e-mirror image, and the image in the second range 1032 is to provide an around view image.

The first range 1031 may correspond to a far field and the second range 1032 may correspond to a near field.

The rear camera 810b may include a second lens unit 811b and a second image sensor 814b.

The second lens unit 811b may have a wide angle in the horizontal direction and the vertical direction.

The horizontal angle of view of the second lens unit 811b may be equal to the vertical angle of view thereof.

Figure 14A:
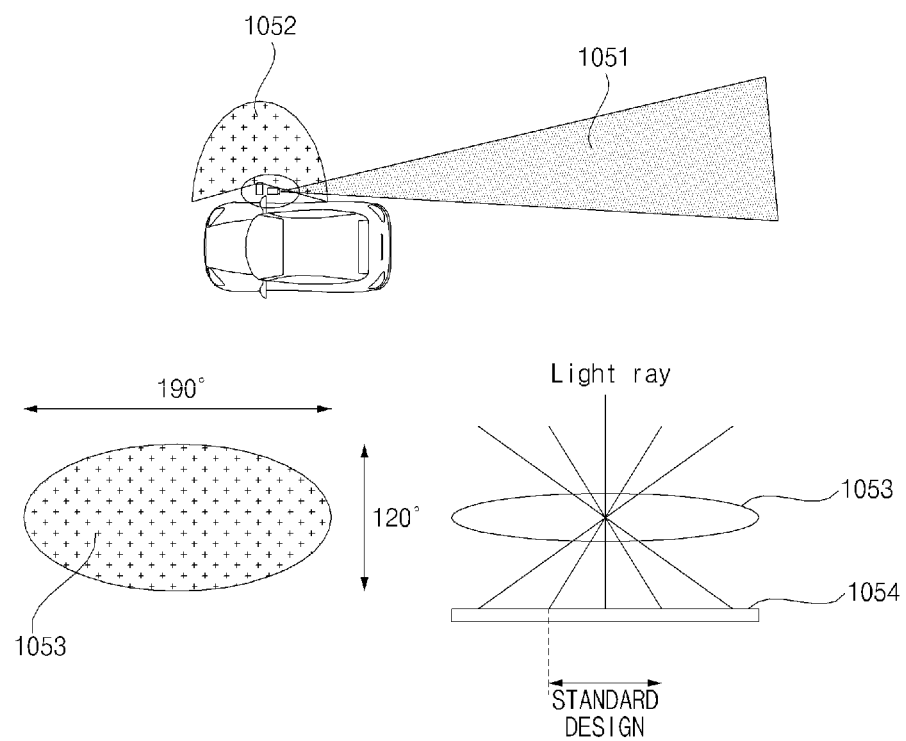
FIG. 14A is a diagram referenced to describe an example operation of a right camera of an around view monitoring apparatus for a vehicle.

FIG. 14A is a diagram referenced to describe an example operation of a right camera of an around view monitoring apparatus for a vehicle.

Referring to FIG. 14A, the vehicle according to the related art includes a plurality of cameras for the purpose of acquiring images.

The vehicle according to the related art includes a camera for capturing an image in a first range 1051 and a camera for capturing an image in a second range 1052.

The camera for capturing the image in the second range 1052 is a right camera of an around view monitoring apparatus.

The camera for capturing the image in the first range 1051 is a camera for capturing a right rear e-mirror image.

The right camera of the around view monitoring apparatus is mounted in the vehicle to face a road surface.

The right camera of the around view monitoring apparatus includes a lens 1053 and an image sensor 1054.

The lens 1053 has a wide angle in a horizontal direction.

The right camera of the around view monitoring apparatus acquires a wide-angle image in the horizontal direction.

Figure 14B:
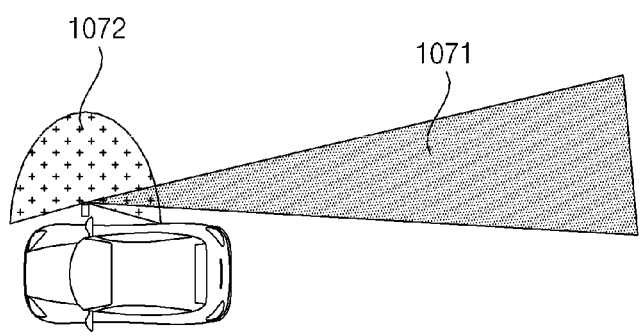
FIGS. 14B-14C are diagrams referenced to describe an example operation of a right camera of an around view monitoring apparatus for a vehicle according to an implementation.
Figure 14B:
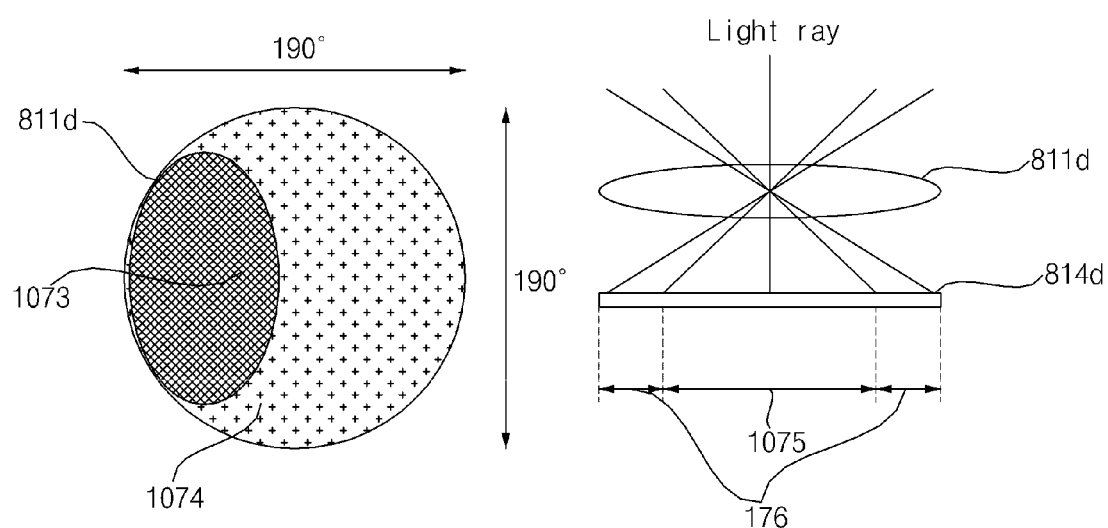
Figure 14C:
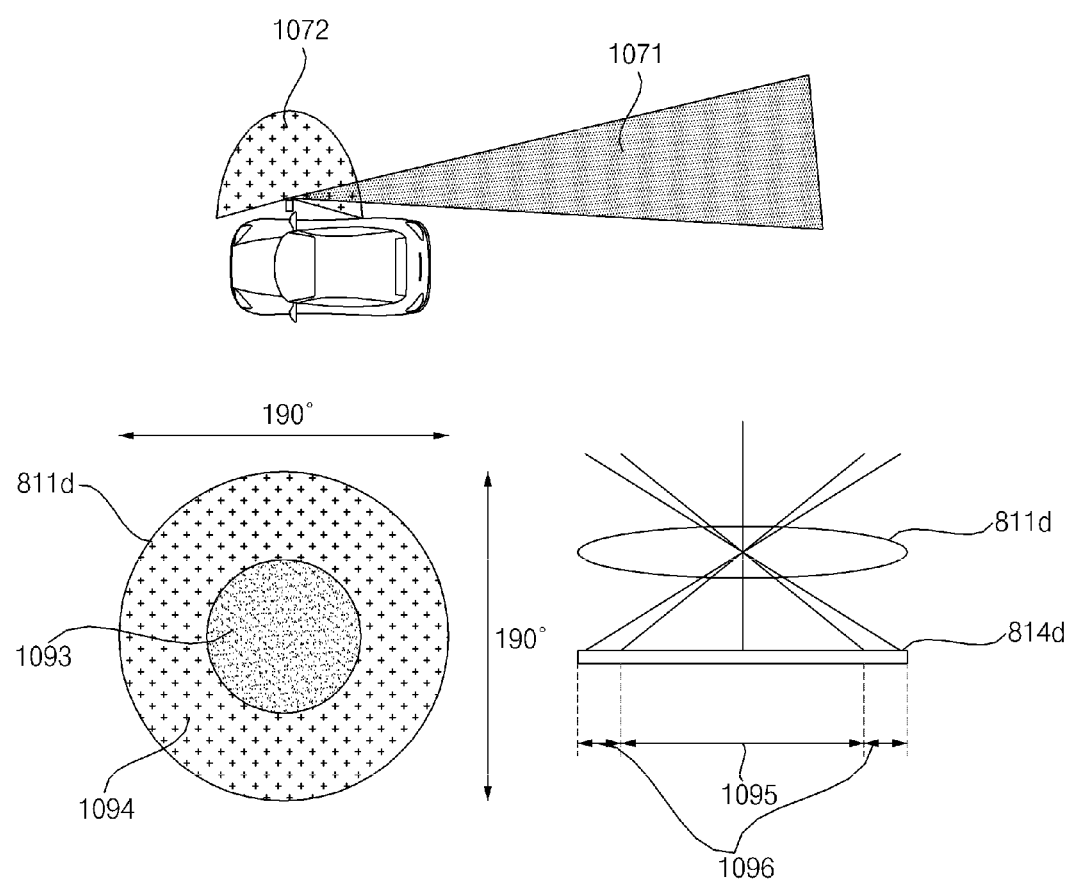

FIGS. 14B-14C are diagrams referenced to describe an example operation of a right camera of an around view monitoring apparatus for a vehicle according to an implementation.

FIGS. 14B to 14C show the right camera 810d. The left camera 810c is bilaterally symmetrical to the right camera 810d with respect to the center of the overall width direction of the vehicle 100.

Referring to FIG. 14B, the right camera 810d may be mounted in the vehicle 100 to face to the right.

The right camera 810d may generate the image in a first range 1071 and a second range 1072.

The image in the first range 1071 serves to provide a right rear e-mirror image, and the image in the second range 1072 serves to provide an around view image.

The first range 1071 may correspond to a far field and the second range 1702 may correspond to a near field.

The right camera 810d may include a fourth lens unit 811d and a fourth image sensor 814d.

The fourth lens unit 811d may form different focal lengths in a first region (e.g., left region) and a second region (e.g., right region) of the right image.

The first region of the right image may be an image acquisition region in the far field.

The second region of the right image may be an image acquisition region in the near field.

The fourth lens unit 811d may include a first region 1073 and a second region 1074.

The first region 1073 may be a region for acquiring an image located at a relatively long distance.

The second region 1074 may be a region for acquiring an image located at a relatively short distance.

The focal length of the first region 1073 of the fourth lens unit 811d may be greater than that of the second region 1074 of the fourth lens unit 811d.

The focal length of the second region 1074 of the fourth lens unit 811d may be less than that of the first region 1073 of the fourth lens unit 811d.

The fourth image sensor 814d may include a fifth pixel array 1075 and a sixth pixel array 1076.

The fifth pixel array 1075 may correspond to the left region of the right image.

The fifth pixel array 1075 may correspond to the first region 1073 of the fourth lens unit 811d.

The sixth pixel array 1076 may correspond to the right region of the right image.

The sixth pixel array 1076 may correspond to the second region 1074 of the fourth lens unit 811d.

The pixel density of the fifth pixel array 1075 may be different from that of the sixth pixel array 1076.

The pixel density of the fifth pixel array 1075 may be greater than that of the sixth pixel array 1076.

The pixel density of the sixth pixel array 1076 may be less than that of the fifth pixel array 1075.

The left camera 810c may be mounted in the vehicle 100 to face to the left.

The left camera 810c may generate the image in the first range of the second range.

The image in the first range serves to provide a right rear e-mirror image, and the image in the second range serves to provide an around view image.

The first range 1071 may correspond to a far field and the second range 1702 may correspond to a near field.

The left camera 810c may include a third lens unit 811c and a third image sensor 814c.

The third lens unit 811c may form different focal lengths in a first region (e.g., right region) and a second region (e.g., left region) of the left image.

The first region of the left image may be an image acquisition region in the far field.

The second region of the left image may be an image acquisition region in the near field.

The third lens unit 811c may include a first region and a second region.

The first region may be a region for acquiring an image located at a relatively long distance.

The first region may be a region for acquiring an image located at a relatively short distance.

The focal length of the first region of the third lens unit 811c may be greater than that of the second region of the third lens unit 811c.

The focal length of the second region of the third lens unit 811c may be less than that of the first region of the third lens unit 811c.

The third image sensor 814c may include a third pixel array and a fourth pixel array.

The third pixel array may correspond to the right region of the left image.

The third pixel array may correspond to the first region of the third lens unit 811c.

The fourth pixel array may correspond to the left region of the left image.

The fourth pixel array may correspond to the second region of the third lens unit 811c.

The pixel density of the third pixel array may be different from that of the fourth pixel array.

The pixel density of the third pixel array may be greater than that of the fourth pixel array.

The pixel density of the fourth pixel array may be less than that of the third pixel array.

Referring to FIG. 14C, the right camera 810d may include a fourth lens unit 811d and a fourth image sensor 814d.

The fourth lens unit 811d may form different focal lengths in a first region (e.g., central region) and a second region (e.g., peripheral region) of the right image.

The fourth lens unit 811d may include a first region 1093 and a second region 1094.

The first region 1093 may be a region for acquiring an image located at a relatively short distance.

The second region 1094 may be a region for acquiring an image located at a relatively long distance.

The focal length of the first region 1093 of the fourth lens unit 811d may be less than that of the second region 1094 of the fourth lens unit 811d.

The focal length of the second region 1094 of the fourth lens unit 811d may be greater than that of the first region 1094 of the fourth lens unit 811d.

The fourth image sensor 814d may include a fifth pixel array 1095 and a sixth pixel array 1096.

The fifth pixel array 1095 may correspond to the central region of the right image.

The fifth pixel array 1095 may correspond to the first region 1093 of the fourth lens unit 811d.

The sixth pixel array 1096 may correspond to the peripheral region of the right image.

The sixth pixel array 1096 may correspond to the second region 1094 of the fourth lens unit 811d.

The pixel density of the fifth pixel array 1075 may be different from that of the sixth pixel array 1076.

The pixel density of the fifth pixel array 1075 may be less than that of the sixth pixel array 1076.

The pixel density of the sixth pixel array 1076 may be greater than that of the fifth pixel array 1075.

The left camera 810c may include a third lens unit 811c and a third image sensor 814c.

The third lens unit 811c may form different focal lengths in a first region (e.g., central region) and a second region (e.g., peripheral region) of the left image.

The third lens unit 811c may include a first region and a second region.

The first region may be a region for acquiring an image located at a relatively short distance.

The second region may be a region for acquiring an image located at a relatively long distance.

The focal length of the first region of the third lens unit 811c may be less than that of the second region of the third lens unit 811c.

The focal length of the second region of third lens unit 811c may be greater than that of the first region of the third lens unit 811c.

The third image sensor 814c may include a third pixel array and a fourth pixel array.

The third pixel array may correspond to the central region of the left image.

The third pixel array may correspond to the first region of the third lens unit 811c.

The fourth pixel array may correspond to the peripheral region of the left image.

The fourth pixel array may correspond to the second region of the third lens unit 811c.

The pixel density of the third pixel array may be different from that of the fourth pixel array.

The pixel density of the third pixel array may be less than that of the fourth pixel array.

The pixel density of the fourth pixel array may be greater than that of the third pixel array.

Figure 15A:
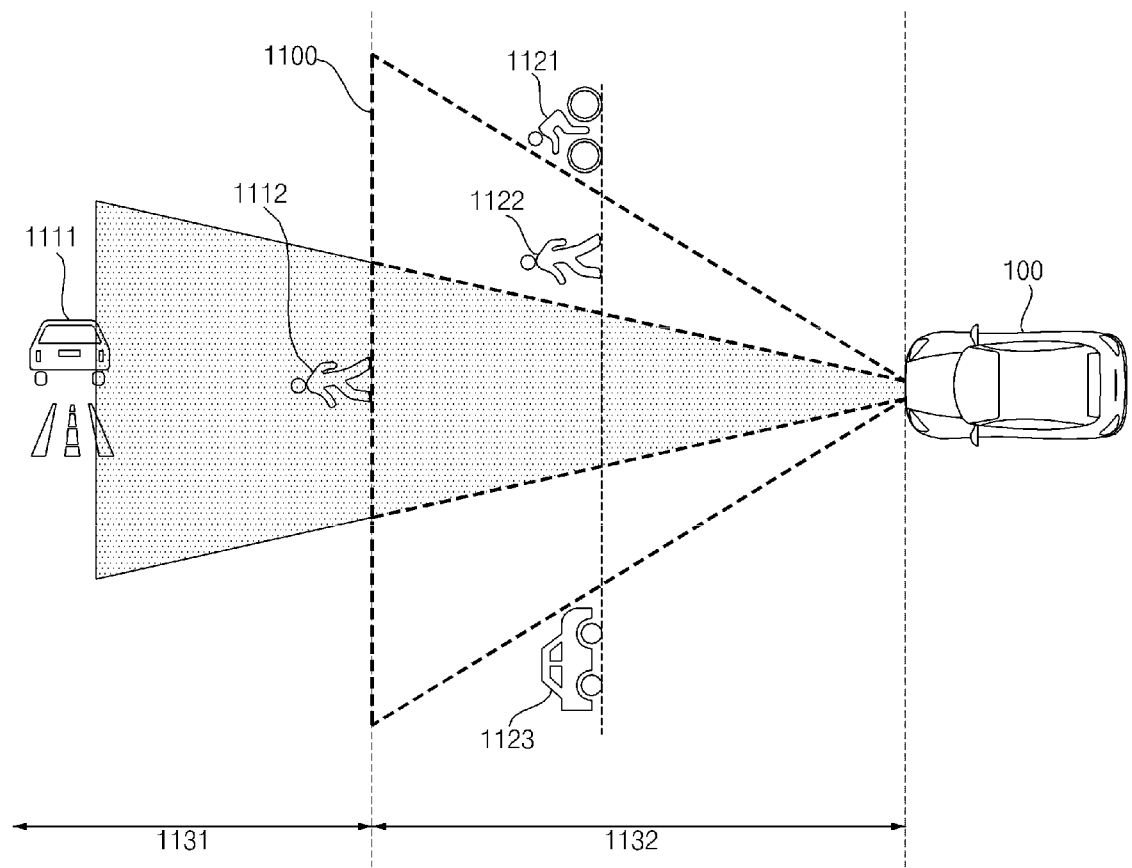
FIG. 15A is a diagram illustrating a far field and a near field according to an implementation.

FIG. 15A is a diagram illustrating a far field and a near field according to an implementation.

Referring to FIG. 15A, a space located at a distance from the front of the vehicle 100 farther than a reference distance 1100 may be defined as a far field 1131.

For example, the far field 1131 may mean a space separated from the vehicle 100 by 80 m or more ahead of the vehicle 100.

A space closer to the vehicle than the reference distance 100 may be defined as a near field 1132.

For example, the near field 1132 may mean a space separated from the vehicle 100 by 80 m or less ahead of the vehicle 100.

The vehicle camera apparatus 310 may acquire images of objects 1111 and 1112 located in the far field and images of objects 1121, 1122 and 1123 located in the near field.

Figure 15B:
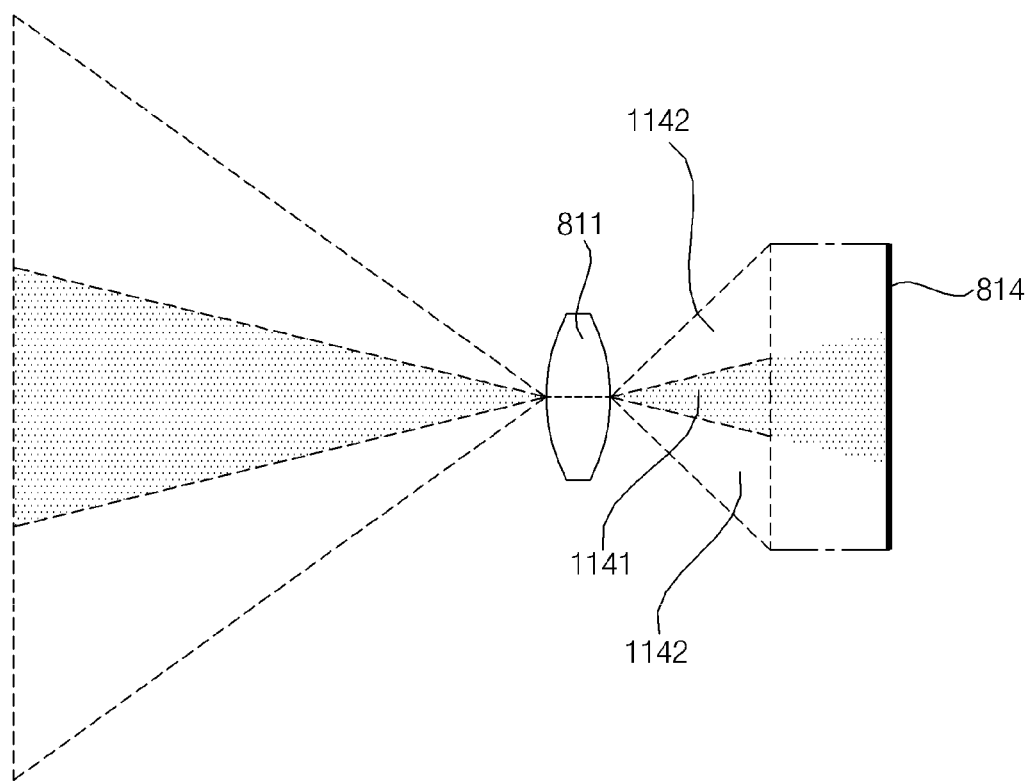
FIG. 15B is a diagram illustrating an image acquisition region according to an implementation.

FIG. 15B is a diagram illustrating an image acquisition region according to an implementation.

Referring to FIG. 15B, a plurality of image acquisition regions may include a central region 1141 and a peripheral region 1142.

The central region 1141 may be an image acquisition region of the far field. The central region 1411 may be a space formed between the lens unit 811 and the image sensor 814 and may be a region for acquiring an image in the far field.

The peripheral region 1142 may be an image acquisition region of the near field. The peripheral region 1142 may be a space formed between the lens unit 811 and the image sensor 814 and may be a region for acquiring an image in the near field.

The focal length of the lens unit 811 in the central region 1141 may be greater than that of the lens unit 811 in the peripheral region 1142.

The lens unit 811 in the central region 1141 is formed to be suitable for detection of an object located in the far field. The lens unit 811 in the peripheral region 1142 is formed to be suitable for detection of an object located in the near field. Accordingly, the focal length of the lens unit 811 in the central region 1141 should be greater than that of the lens unit 811 in the peripheral region 1142.

The angle of view of the lens unit 811 in the central region 1141 may be less than that of the lens unit 811 in the peripheral region 1142.

The lens unit 811 in the central region 1141 is formed to be suitable for detection of an object located in the far field. The lens unit 811 in the peripheral region 1142 is formed to be suitable for detection of an object located in the near field. Accordingly, the focal length of the lens unit 811 in the central region should be less than that of the lens unit 811 in the peripheral region.

Figure 16:
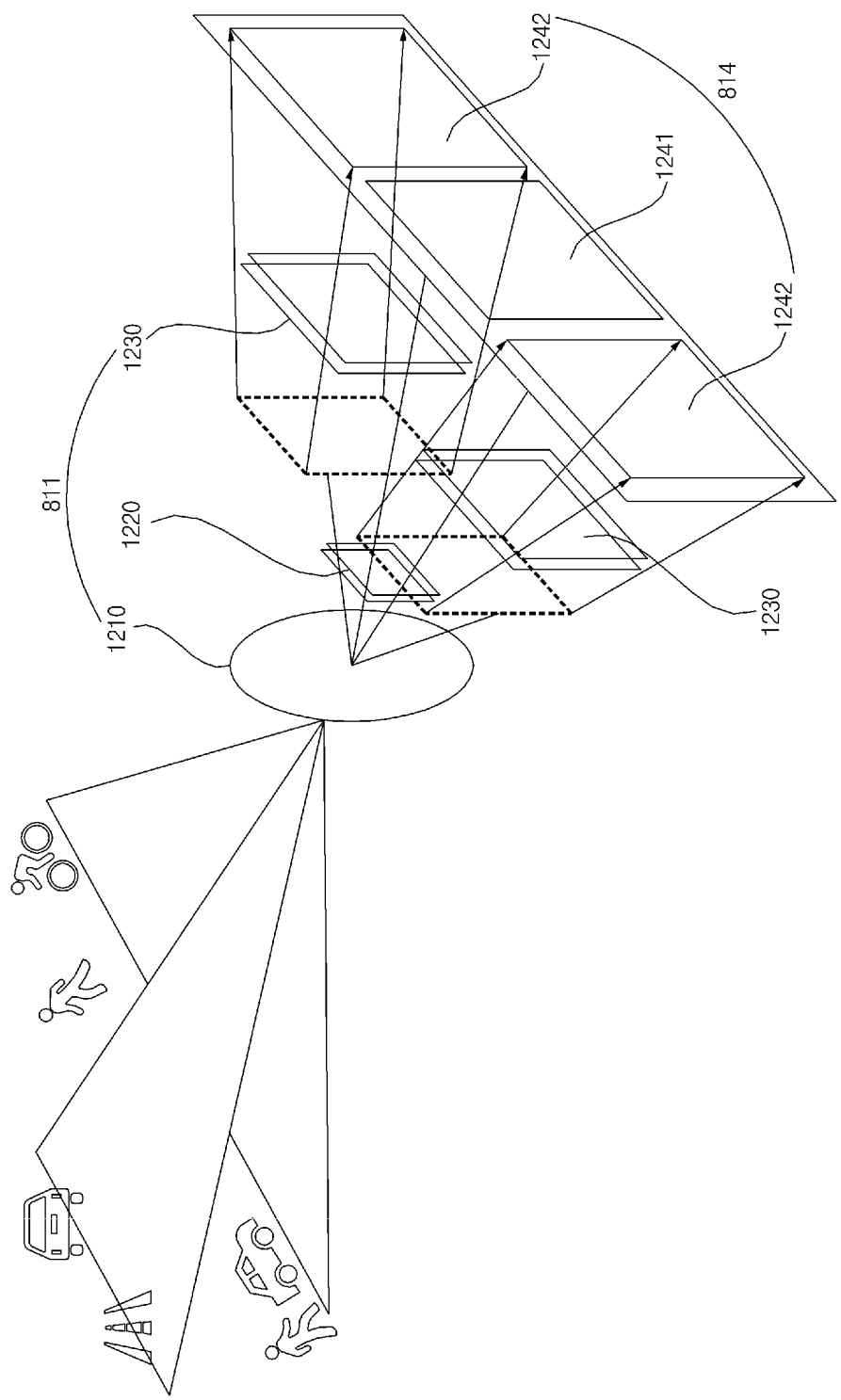
FIG. 16 is a diagram illustrating an example configuration of a camera device for a vehicle according to an implementation.

FIG. 16 is a diagram illustrating an example configuration of a camera device for a vehicle according to an implementation.

Referring to FIG. 16, the lens unit 811 may include a reference lens 1210, a zonal lens 1220 and a field lens 1230.

For example, at least one of the first lens unit 811a, the second lens unit 811b, the third lens unit 811c and the fourth lens unit 811d (e.g., as shown in FIG. 10) may include the reference lens 1210, the zonal lens 1220 and the field lens 1230.

The reference lens 1210 may transmit light over a plurality of image acquisition regions.

The reference lens 1210 may have a fixed focal length.

For example, the reference lens 1210 may be a short focal-length lens.

For example, the reference lens 1210 may be a long focal-length lens.

The reference lens 1210 may have a uniform focal length over the plurality of image acquisition regions.

The zonal lens 1220 may be disposed between the reference lens 1210 and the image sensor 814.

The zonal lens 1220 may distinguish among the plurality of image acquisition regions. The plurality of image acquisition regions may be distinguished depending on whether light passing through the reference lens 1210 passes through the zonal lens 1220 or not.

For example, a region, in which light passing through the reference lens 1210 passes through the zonal lens 1220, of the plurality of image acquisition regions may be defined as the central region 1141. In this case, a region, in which light passing through the reference lens 1210 does not pass through the zonal lens 1220, of the plurality of image acquisition regions may be defined as the peripheral region 1142. (e.g., Implementation described in FIG. 13)

For example, a region, in which light passing through the reference lens 1210 does not pass through the zonal lens 1220, of the plurality of image acquisition regions may be defined as the central region 1141. In this case, a region, in which light passing through the reference lens 1210 passes through the zonal lens 1220, of the plurality of image acquisition regions may be defined as the peripheral region 1142. (Implementation described in FIG. 14)

The focal length of each of the plurality of image acquisition regions may be changed depending on whether light passing through the reference lens 1210 passes through the zonal lens 1220 or not.

For example, when the reference lens 1210 is a short focal-length lens, the focal length of the region in which light passing through the reference lens 1210 passes through the zonal lens 1220 may increase.

For example, when the reference lens 1210 is a long focal-length lens, the focal length of the region in which light passing through the reference lens 1210 passes through the zonal lens 1220 may decrease.

The field lens 1230 may deliver an image formed on a plane other than of the plane of the image sensor 814 to the plane of the image sensor 814.

The image sensor 814 may be disposed in the central region 1141 based on the focal length of the lens unit 811. The image sensor 814 may be disposed on the plane on which an image is formed in the central region 1141.

In this case, the location of the image sensor 814 may not match the focal length of the lens unit 811 in the peripheral region 1142. The image sensor 814 may not be disposed on the plane on which the image is formed in the peripheral region 1141.

In this case, the field lens 1230 may deliver the image formed in the peripheral region 1141 to the plane on which the image sensor 814 is disposed.

FIGS. 17 to 20 are diagrams referenced to describe a camera device for a vehicle according to an implementation.

Figure 17:
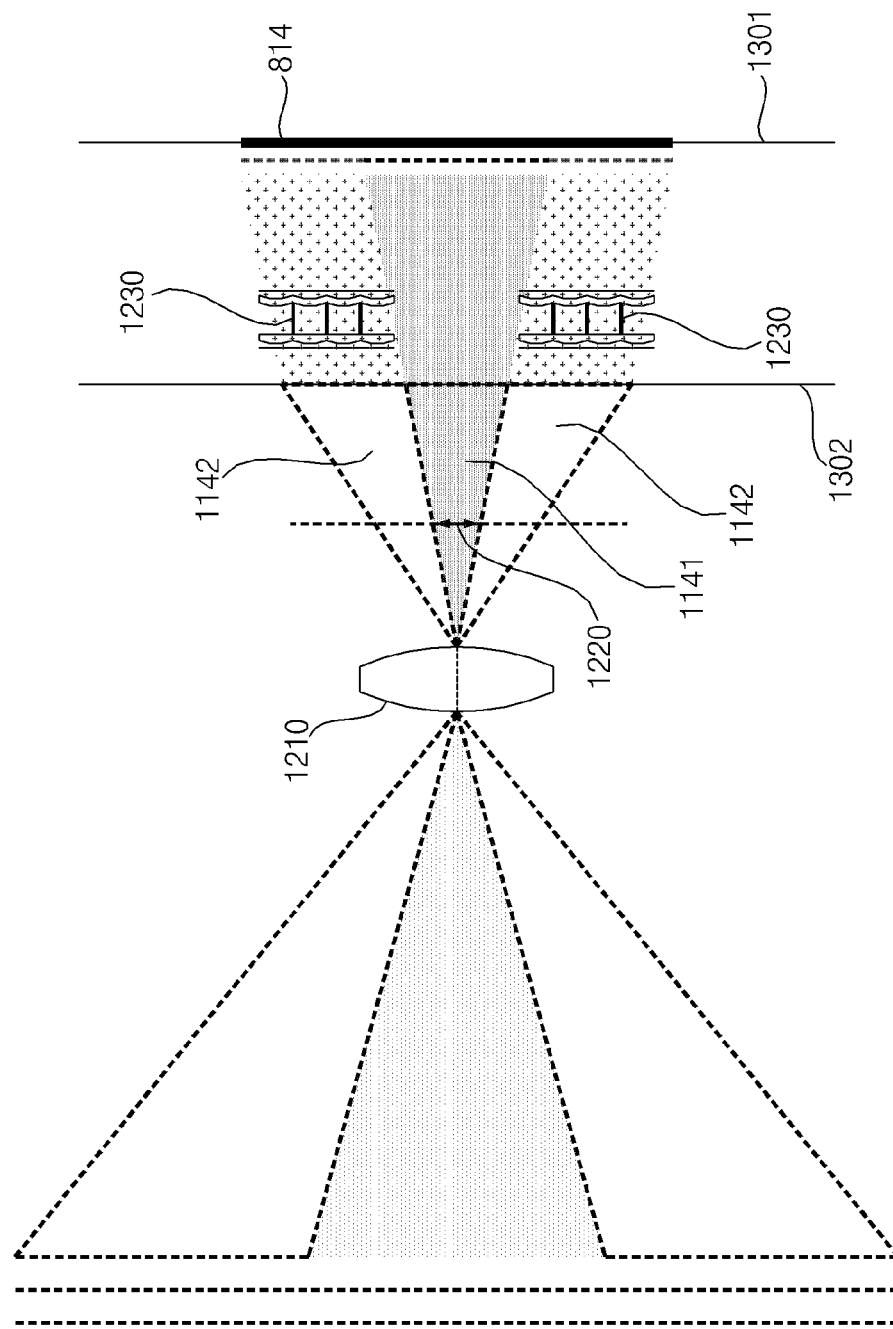
FIGS. 17 to 20 are diagrams referenced to describe a camera device for a vehicle according to an implementation.

Referring to FIG. 17, the plurality of image acquisition regions may include a central region 1141 and a peripheral region 1142.

The central region 1141 may be a region in which light passing through the reference lens 1210 passes through the zonal lens 1220.

The peripheral region 1142 may be a region in which light passing through the reference lens 1210 does not pass through the zonal lens 1220.

The reference lens 1210 may have a first focal length. The reference lens 1210 may be a short focal-length lens.

The zonal lens 1220 may be disposed between the reference lens 1210 and the image sensor 814.

The zonal lens 1220 may be disposed to match the center of the reference lens 1210.

In some implementations, the reference lens 1210 and the zonal lens 1220 may be integrally formed.

The zonal lens 1220 may enable the focal length of the lens unit 811 in the central region 1141 to be greater than that of the lens unit 811 in the peripheral region 1142.

The image sensor 814 may be disposed on a first plane 1301 on which an image is formed in the central region 1141. Here, the first plane may be a virtual plane on which an image is formed by light passing through the lens unit 811 in the central region 1141.

The lens unit 811 may further include a field lens 1230. The field lens 1230 may deliver the image of the peripheral region 1142 formed on the second plane 1302 at a location different from that of the first plane 1301 to the image sensor 814. The second plane may be a virtual plane on which an image is formed by light passing through the lens unit 811 in the peripheral region. The second plane may have a location different from that of the first plane.

Since the focal length of the central region 1141 is different from that of the peripheral region 1142, a plane on which an image is formed is changed. In this case, the field lens 1230 delivers the image formed on the plane 1302 other than the plane of the image sensor 814 to the plane 1301 of the image sensor 814.

Figure 18:
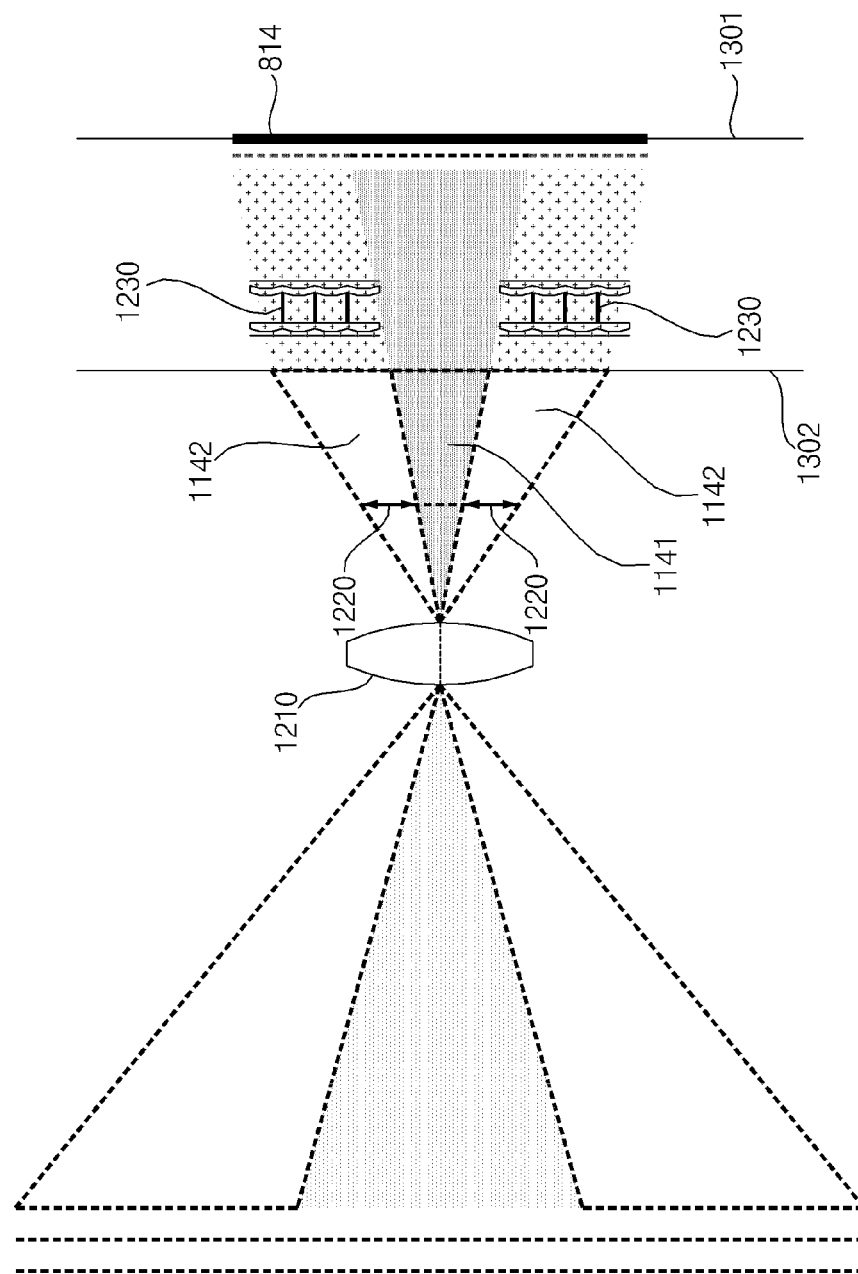

Referring to FIG. 18, the plurality of image acquisition regions may include a central region 1141 and a peripheral region 1142.

The central region 1141 may be a region in which light passing through the reference lens 1210 does not pass through the zonal lens 1220.

The peripheral region 1142 may be a region in which light passing through the reference lens 1210 passes through the zonal lens 1220.

The reference lens 1210 may have a second focal length. The reference lens 1210 may be a long focal-length lens.

The zonal lens 1220 may be disposed between the reference lens 1210 and the image sensor 814.

The zonal lens 1220 may be disposed to match the peripheral region of the reference lens 1210.

In some implementations, the reference lens 1210 and the zonal lens 1220 may be integrally formed.

The zonal lens 1220 may enable the focal length of the lens unit 811 in the peripheral region 1142 to be less than that of the lens unit 811 in the central region 1441.

The image sensor 814 may be disposed on the first plane 1301 on which an image is formed in the central region 1141. Here, the first plane may be a virtual plane on which an image is formed by light passing through the lens unit 811 in the central region 1141.

The lens unit 811 may further include a field lens 1230. The field lens 1230 may deliver the image of the peripheral region 1142 formed on the second plane 1302 at a location different from that of the first plane 1301 to the image sensor 814. The second plane may be a virtual plane on which an image is formed by light passing through the lens unit 811 in the peripheral region. The second plane may have a location different from that of the first plane.

Since the focal length of the central region 1141 and the focal length of the peripheral region 1142 are different from each other, a plane on which an image is formed is changed. In this case, the field lens 1230 delivers the image formed on the plane 1302 other than the plane of the image sensor 814 to the plane 1301 of the image sensor 814.

Figure 19:
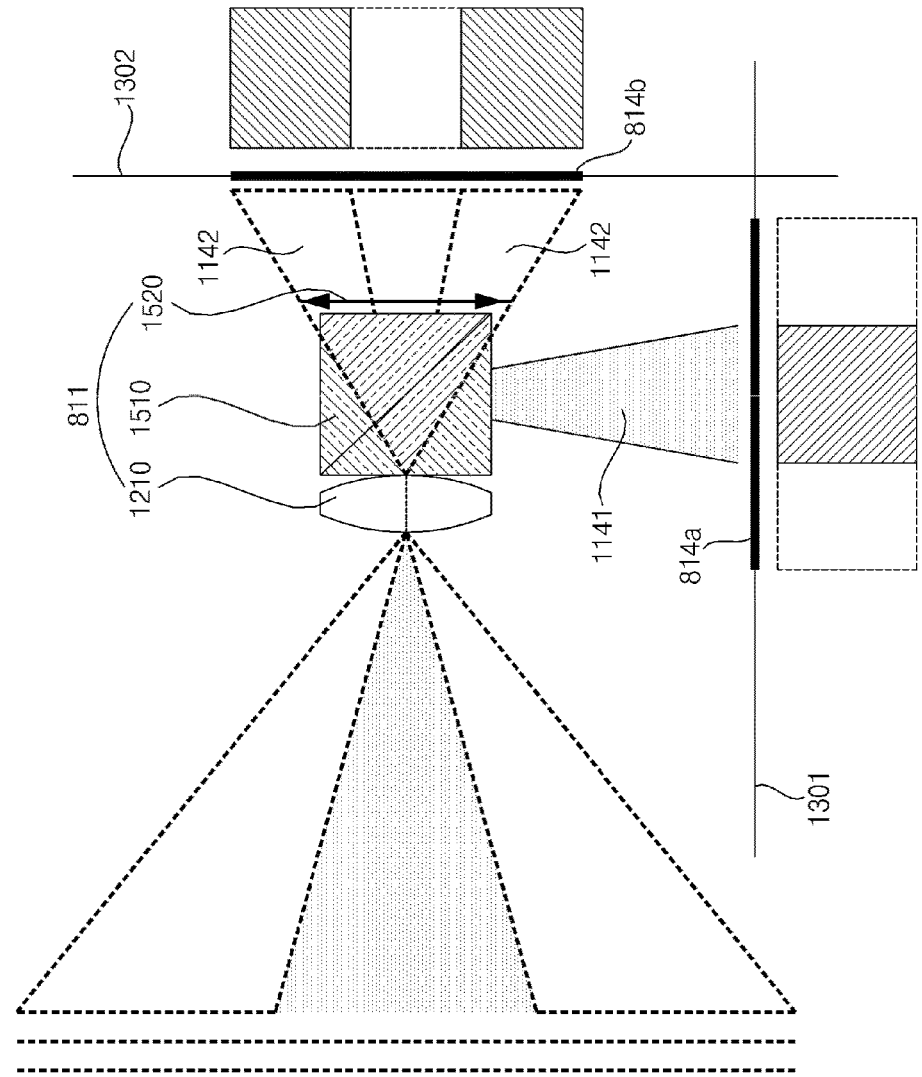

Referring to FIG. 19, the lens unit 811 may include a reference lens 1210, and a beam splitter 1510.

The reference lens 1210 may have a first focal length. The reference lens 1210 may be a short focal-length lens.

The reference lens 1210 may have a second focal length. The reference lens 1210 may be a long focal-length lens.

The beam splitter 1510 may be disposed between the reference lens 1210 and the image sensor 814.

The beam splitter 1510 may split incident light into first light having a first optical path and second light having a second optical path.

The beam splitter 1510 may have a prism.

The plurality of image acquisition regions may include a central region 1141 and a peripheral region 1142.

The central region 1141 may be a region in which an image is acquired by the first light.

The peripheral region 1142 may be a region in which an image is acquired by the second light.

In some implementations, the image sensor 814 may include a first image sensor 814*a* and a second image sensor 814*b*.

The first image sensor 814*a* may include a central pixel array. The first image sensor 814*a* may convert the first light into an electrical signal.

The first image sensor 814a may be disposed on the first plane 1301 on which an image is formed in the central region 1141.

The second image sensor 814b may include a peripheral pixel array. The second image sensor 814b may convert the second light into an electrical signal.

The second image sensor 814b may be disposed on the second plane 1302 on which an image is formed in the peripheral region 1142. The second plane may have a location different from that of the first plane.

The lens unit 811 may further include an additional lens 1520.

The additional lens 1520 may be disposed between the beam splitter 1510 and the first image sensor 814a.

In this case, the additional lens 1520 may adjust the focal length of the lens unit 811 in the central region 1141.

When the reference lens 1210 has a first focal length, the additional lens 1520 may enable the focal length of the lens unit 811 in the central region 1141 to be greater than that of the lens unit 811 in the peripheral region 1142.

The additional lens 1520 may be disposed between the beam splitter 1510 and the second image sensor 814b.

In this case, the additional lens 1520 may adjust the focal length of the lens unit 811 in the peripheral region 1142.

When the reference lens 1210 has a second focal length, the additional lens 1520 may enable the focal length of the lens unit 811 in the peripheral region 1142 to be less than that of the lens unit 811 in the central region 1181.

By providing the additional lens 1520, it is possible to adjust the location of the image sensor 814.

The lens unit 811 may further include a field lens.

The field lens may be disposed between the beam splitter 1510 and the first image sensor 814a.

The field lens may deliver the image formed on the plane other than the plane on which the first image sensor 814a is disposed in the central region to the plane on which the first image sensor 814a is disposed.

The field lens may be disposed between the beam splitter 1510 and the second image sensor 814b.

The field lens may deliver the image formed on the plane other than the plane on which the second image sensor 814b is disposed in the peripheral region to the plane on which the second image sensor 814b is disposed.

In some implementations, the processor 970 may crop and acquire a part corresponding to the central region from the image acquired through the first image sensor 814a.

The processor 970 may crop and acquire a part corresponding to the peripheral region from the image acquired through the second image sensor 814b.

Figure 20:
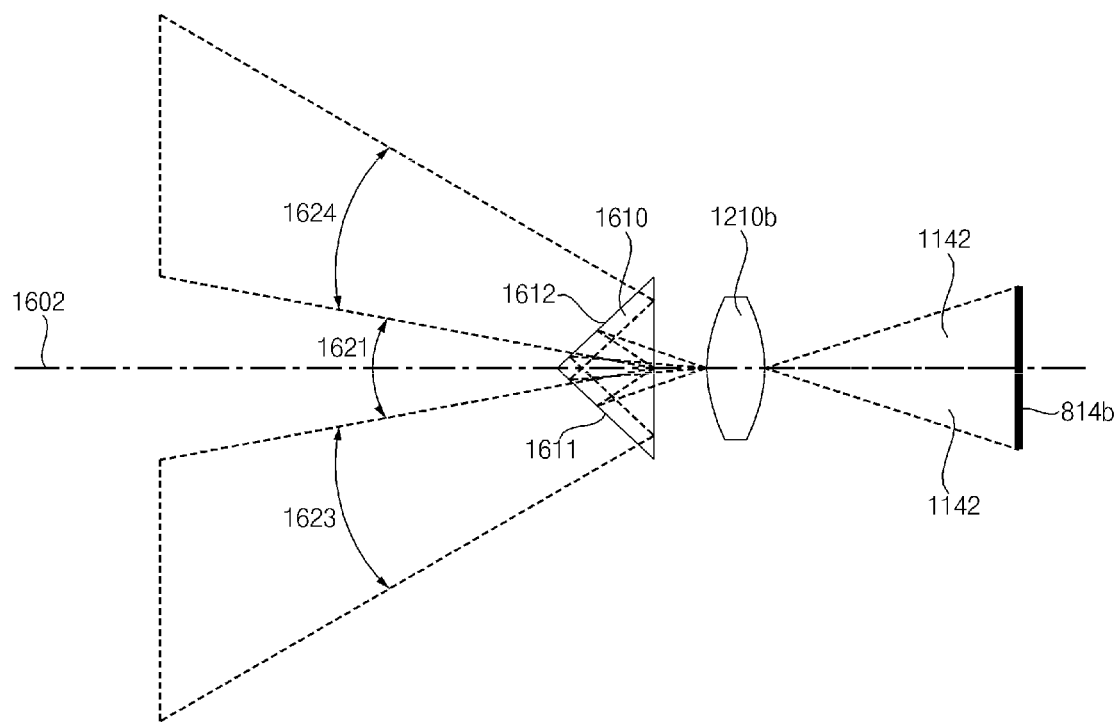
Figure 20:
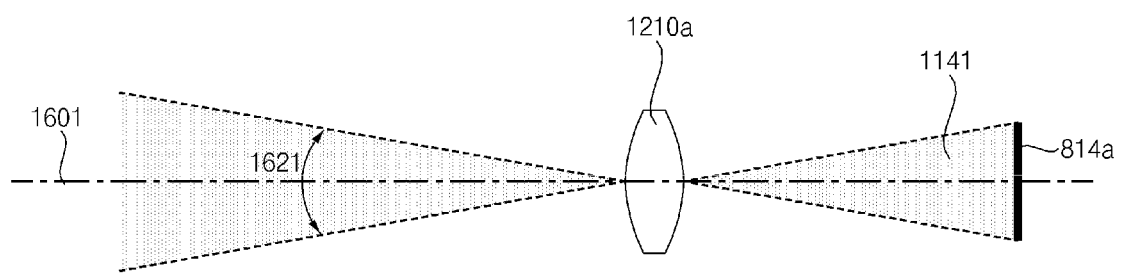

Referring to FIG. 20, the lens unit 811 may include a first reference lens 1210a, a second reference lens 1201b and a loop prism 1610.

The first reference lens 1210a may have a first focal length. The first reference lens 1210a may be a long focal-length lens.

The first reference lens 1210a may be located on a first optical path 1601.

The second reference lens 1210b may have a second focal length. The second reference lens 1210b may be a short focal-length lens.

The second reference lens 1210b may be located on a second optical length 1602. The second optical path 1602 may be different from the first optical path 1601.

The loop prism 1610 may be located on the second optical path 1602. The loop prism 1610 may be disposed ahead of the second reference lens 1210b. Light may be input to the second reference lens 1210b through the loop prism 1610.

In some implementations, the plurality of image acquisition regions may include a central region 1141 and a peripheral region 1142.

The central region 1141 may be a region in which light passes through the first reference lens 1210a.

The peripheral region 1142 may be a region in which light passes through the loop prism 1610 and the second reference lens 1210b.

In some implementations, the first reference lens 1210a may have a predetermined viewing angle in the horizontal direction. The viewing angle of the first reference lens 1210a may be defined as a first angle.

In some implementations, the loop prism 1610 may include a first incident surface 1611 and a second incident surface 1612.

The horizontal angle of light input through the first incident surface 1611 may be defined as a third angle.

The horizontal angle of light input through the second incident surface 1612 may be defined as a fourth angle.

An angle obtained by subtracting the third angle and the fourth angle from the horizontal angle of light input through the second reference lens 1210b may be defined as a second angle.

The first to fourth angles may have the following relationships.

The first angle may be greater than or equal to the second angle. The third angle may be greater than or equal to the first angle. The fourth angle may be greater than or equal to the first angle. The third angle may be greater than or equal to the fourth angle. The fourth angle may be greater than or equal to the third angle.

The image sensor 814 may include a first image sensor 814a and a second image sensor 814b.

The first image sensor 814a may include a central pixel array. The first image sensor 814a may convert the first light into an electrical signal.

The first image sensor 814a may be disposed on the first plane 1301 on which the image is formed in the central region 1141.

The second image sensor 814b may include a peripheral pixel array. The second image sensor 814b may convert the second light into an electrical signal.

The second image sensor 814b may be disposed on the second plane 1302 on which the image is formed in the peripheral region 1142. The second plane may have a location different from that of the first plane.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include a processor or a controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An around view monitoring apparatus comprising:
a plurality of cameras; and
at least one processor configured to process a plurality of images acquired through the plurality of cameras,
wherein one or more of the plurality of cameras comprise a lens unit having a first focal length to form a first region of each of the acquired images and a second focal length to form a second region of each of the acquired images, the second focal length being different from the first focal length,
wherein the plurality of cameras comprise at least one of:
a front camera configured to acquire a front image of a vehicle, the front camera comprising a front lens unit having a third focal length corresponding to a central region of the front image and a fourth focal length corresponding to a peripheral region of the front image, the fourth focal length being different from the third focal length,
a rear camera configured to acquire a rear image of the vehicle,
a left camera configured to acquire a left image of the vehicle, the left camera comprising a left lens unit having a fifth focal length corresponding to a right region of the left image and a sixth focal length corresponding to a left region of the left image, the sixth focal length being less than the fifth focal length, or
a right camera configured to acquire a right image of the vehicle, the right camera comprising a right lens unit having a seventh focal length corresponding to a left region of the right image and an eighth focal length corresponding to a right region of the right image, the eighth focal length being less than the seventh focal length.

2. The around view monitoring apparatus according to claim 1, wherein the first region corresponds to a first angle of view, and the second region corresponds to a second angle of view larger than the first angle of view.

3. The around view monitoring apparatus according to claim 2, wherein the processor is configured to process the plurality of images acquired through the plurality of cameras by:
separating the first region and the second region; and
processing the first region and the second region.

4. The around view monitoring apparatus according to claim 3, wherein the processor is configured to process the first region and the second region by:
generating a narrow-angle image based on the first region; and
generating a wide-angle image by synthesizing the first region and the second region based on a mapping function.

5. The around view monitoring apparatus according to claim 4, further comprising an interface configured to exchange data with one or more devices in the vehicle,
wherein the processor is further configured to provide, through the interface, the narrow-angle image and the wide-angle image to the one or more devices.

6. The around view monitoring apparatus according to claim 5, wherein the processor is configured to provide the narrow-angle image and the wide-angle image to the one or more devices by:
alternating between providing, in frame units or slice units, (i) the narrow-angle image, and (ii) the wide-angle image to the one or more devices.

7. The around view monitoring apparatus according to claim 5, wherein the interface comprises first and second ports configured to connect to respective cables, and
wherein the processor is configured to provide the narrow-angle image and the wide-angle image to the one or more devices by:
providing, through the first port, the narrow-angle image; and
providing, through the second port, the wide-angle image.

8. The around view monitoring apparatus according to claim 4, further comprising a display unit,
wherein the processor is further configured to display, through the display unit, an image based on the narrow-angle image and the wide-angle image.

9. The around view monitoring apparatus according to claim 1, wherein the one or more of the plurality of cameras comprise an image sensor comprising two or more pixel arrays,
wherein each of the two or more pixel arrays corresponds to one of two or more regions, and is configured to convert light transmitted through the lens unit to the two or more pixel arrays into one or more electrical signals.

10. The around view monitoring apparatus according to claim 9, wherein the two or more pixel arrays have different pixel densities.

11. The around view monitoring apparatus according to claim 1, wherein a vertical angle of view of the front image is equal to a horizontal angle of view of the front image.

12. The around view monitoring apparatus according to claim RUM,
wherein the front camera comprises a first image sensor comprising:
a first pixel array corresponding to the central region; and
a second pixel array corresponding to the peripheral region, and
wherein the first pixel array and the second pixel array have different pixel densities.

13. The around view monitoring apparatus according to claim 1,
wherein the processor is further configured to correct a lens distortion of the front image.

14. The around view monitoring apparatus according to claim 1,
wherein the rear camera comprises a rear lens unit having a focal length to form the rear image.

15. The around view monitoring apparatus according to claim 14, wherein a vertical angle of view of the rear image is equal to a horizontal angle of view of the rear image.

16. The around view monitoring apparatus according to claim 1,
wherein the left camera comprises a third image sensor comprising:
a third pixel array corresponding to the right region of the left image; and
a fourth pixel array corresponding to the left region of the left image, and
wherein the third pixel array and the fourth pixel array have different pixel densities.

17. The around view monitoring apparatus according to claim 1,
wherein the right camera comprises a fourth image sensor comprising:
a fifth pixel array corresponding to the left region of the right image; and a sixth pixel array corresponding to the right region of the right image, and wherein the fifth pixel array and the sixth pixel array have different pixel densities.

18. The around view monitoring apparatus according to claim 1, wherein the plurality of cameras comprise the front camera, the rear camera, the left camera, and the right camera.

19. The around view monitoring apparatus according to claim 1, wherein the central region is a far field view within the front image, and the peripheral region is a near field view within the front image.

20. The around view monitoring apparatus according to claim 1, wherein the third focal length is greater than the fourth focal length.

* * * * *